US012286243B2

(12) United States Patent
Wu et al.

(10) Patent No.: US 12,286,243 B2
(45) Date of Patent: Apr. 29, 2025

(54) STACKED SPACECRAFT LAUNCH AND ORBIT RAISING

(71) Applicant: Maxar Space LLC, Westminster, CO (US)

(72) Inventors: Gordon Chun Kong Wu, Melbourne, FL (US); David Marlow, Redwood City, CA (US); Jeff Aaron Baldwin, Sunnyvale, CA (US)

(73) Assignee: Maxar Space LLC, Palo Alto, CA (US)

( * ) Notice: Subject to any disclaimer, the term of this patent is extended or adjusted under 35 U.S.C. 154(b) by 100 days.

(21) Appl. No.: 18/302,754

(22) Filed: Apr. 18, 2023

(65) Prior Publication Data

US 2023/0365279 A1   Nov. 16, 2023

Related U.S. Application Data

(60) Provisional application No. 63/341,353, filed on May 12, 2022.

(51) Int. Cl.
*B64G 1/40* (2006.01)
*B64G 1/24* (2006.01)
*B64G 1/64* (2006.01)

(52) U.S. Cl.
CPC ........... *B64G 1/402* (2013.01); *B64G 1/2427* (2023.08); *B64G 1/643* (2023.08)

(58) Field of Classification Search
CPC ..................................................... B64G 1/643
See application file for complete search history.

(56) References Cited

U.S. PATENT DOCUMENTS

| 5,129,602 A   | 7/1992 | Leonard |
| 5,186,419 A * | 2/1993 | Scott ...................... B64G 1/641 |
| | | 244/164 |

(Continued)

FOREIGN PATENT DOCUMENTS

| EP | 3412582 A1 | 12/2018 |
| FR | 3024709 A1 | 8/2014 |

OTHER PUBLICATIONS

Response to Extended European Search Report dated Feb. 9, 2024, European Publication No. 23173170.4.

(Continued)

*Primary Examiner* — Joseph W Sanderson
(74) *Attorney, Agent, or Firm* — Pearl Cohen Zedek Latzer Baratz LLP

(57) ABSTRACT

Technology for orbit raising of multiple spacecraft launched with a single launch vehicle. Two or more spacecraft are configured in a stacked launch configuration in which a lower spacecraft is mechanically coupled with a payload adapter of a launch vehicle with one or more upper spacecraft above the lower spacecraft. Propellant that is stored in the lower spacecraft during launch is transferred to an upper spacecraft in the stack after launch. The propellent may be used by the upper spacecraft for an orbit raising maneuver that raises the orbit of at least the upper spacecraft from a first orbit to a second orbit. Storing the propellant in the lower spacecraft lowers the center of mass of the stack during launch. Lowering the center of mass reduces the structural bending moment of the stack during launch, which allows a greater total launch mass.

20 Claims, 14 Drawing Sheets

(56) References Cited

U.S. PATENT DOCUMENTS

| | | | |
|---|---|---|---|
| 5,242,135 A * | 9/1993 | Scott | B64G 1/641 |
| | | | 244/164 |
| 5,595,360 A | 1/1997 | Spitzer | |
| 5,810,295 A | 9/1998 | Anzel | |
| 6,116,543 A | 9/2000 | Koppel | |
| 6,488,237 B1 | 12/2002 | Glasser et al. | |
| 6,543,723 B1 | 4/2003 | Oh | |
| 7,113,851 B1 | 9/2006 | Gelon et al. | |
| 8,511,617 B2 * | 8/2013 | Caplin | B64G 1/26 |
| | | | 244/173.1 |
| 8,763,957 B1 | 7/2014 | Higham et al. | |
| 8,789,797 B2 * | 7/2014 | Darooka | B64G 1/642 |
| | | | 244/159.4 |
| 8,915,472 B2 | 12/2014 | Aston et al. | |
| 9,108,748 B2 | 8/2015 | Munir et al. | |
| 9,108,749 B2 | 8/2015 | Woo et al. | |
| 9,145,216 B2 * | 9/2015 | Gascon | F03H 1/0062 |
| 10,351,268 B2 * | 7/2019 | Estevez | B64G 1/641 |
| 10,479,534 B1 * | 11/2019 | Baghdasarian | B64G 1/10 |
| 11,021,273 B1 * | 6/2021 | Wu | F17C 13/04 |
| 2008/0237399 A1 * | 10/2008 | Caplin | B64G 1/26 |
| | | | 244/164 |
| 2013/0221162 A1 * | 8/2013 | Darooka | B64G 1/642 |
| | | | 244/173.1 |
| 2016/0075453 A1 | 3/2016 | Sauzay et al. | |
| 2016/0304219 A1 | 10/2016 | Tadros et al. | |
| 2018/0162561 A1 * | 6/2018 | Estevez | B64G 1/1085 |
| 2018/0354659 A1 * | 12/2018 | Baldwin | B64G 1/002 |
| 2021/0122502 A1 * | 4/2021 | Kokorich | B64G 1/648 |
| 2021/0197987 A1 * | 7/2021 | Kokorich | B64G 1/244 |
| 2024/0051685 A1 * | 2/2024 | Shah Khadri | B64G 1/4024 |

OTHER PUBLICATIONS

Extended European Search Report dated Sep. 21, 2023, European Publication No. 23173170.4.

English Abstract of French Publication No. FR3024709 published Aug. 5, 2014.

Communication under Rule 71(3) EPC, European Publication No. 23173170.4.

* cited by examiner

STACKED SPACECRAFT LAUNCH AND
ORBIT RAISING

PRIORITY DATA

The present application claims priority to U.S. Provisional Patent Application No. 63/341,353, filed on May 12, 2022, entitled "STACKED SPACECRAFT LAUNCH AND ORBIT RAISING", which application is incorporated by reference herein in its entirety.

BACKGROUND

The cost to launch spacecraft such as satellites into orbit is extraordinarily expensive. The launch cost per satellite can be reduced by launching multiple satellites with one launch vehicle. In one technique, multiple spacecraft are arranged in a stack with the lowest spacecraft attached to a launch vehicle adaptor. Thus, the satellites are sometimes oriented during launch one above another with respect to the gravitational force of the earth. The launch phase of a launch vehicle is the period in which the launch vehicle powers the flight to raise the launch vehicle above the Earth's atmosphere and accelerate to at least an orbital velocity. In some cases, the launch phase raises the launch vehicle to a transfer orbit. When the launch vehicle is in the transfer orbit, the spacecraft are dispensed from the launch vehicle.

In some techniques, after the multiple spacecraft are dispensed from the launch vehicle orbit raising maneuvers are performed. An orbit raising maneuver transfers a spacecraft from one orbit to another orbit. The orbit raising maneuver increases the size and energy of the orbit, which is referred to herein as orbit raising. One example of an orbit raising maneuver is to transfer (or raise) a spacecraft from a low-altitude transfer orbit (or "parking orbit") to a higher-altitude mission orbit (or "operational orbit"), such as a geosynchronous orbit. For example, after the launch vehicle reaches the launch vehicle transfer orbit, the multiple spacecraft are dispensed from the launch vehicle. Then, the spacecraft are raised to their respective mission orbits such as a geosynchronous orbit. A spacecraft may have an onboard propulsion subsystem to effect such orbit raising.

Spacecraft propulsion subsystems generally include thrusters, which may be broadly categorized as either "chemical" or "electric" based on the respective primary energy source. Chemical thrusters, for example bi-propellant thrusters, deliver thrust by converting chemical energy stored in the propellant to kinetic energy delivered to combustion products of the chemical propellant, e.g., a fuel such as monomethyl hydrazine and an oxidizer such as dinitrogen tetroxide. In general, chemical based propulsion subsystems have higher thrust than electric based propulsion subsystems. For example, a relatively high thrust chemical thruster may have a nominal thrust rating of, for example, 400 N or greater. Some chemical thrusters have a lower nominal thrust ratings closer to 30 N. In contrast, electric based propulsion subsystems may have a nominal thrust rating of about 1N or less. Electric thrusters normally use a high atomic number, easily ionized, inert gas, frequently xenon, as a propellant.

There are numerous technical challenges to overcome when launching multiple spacecraft with one launch vehicle, while providing for orbit raising maneuvers of the spacecraft. One technical challenge is dealing with the structural bending moment on launch. A structural bending moment occurs when force applied to a structure causes the structure to bend. The structural bending moment that occurs during the launch phase can damage the spacecraft. One possible solution is to fortify the spacecraft and/or the structure that supports the spacecraft on launch to limit the impact of the structural bending moment. However, such fortifications typically undesirably add mass.

The time of flight is a term used to refer to the time it takes to raise the orbit of a spacecraft from a parking orbit to its mission orbit. The time of flight can be reduced by using high thrust chemical thrusters for orbit raising. For example, chemical orbit raising typically has a time of flight of two weeks, whereas electric orbit raising could take up to 180 days. However, such high thrust chemical thrusters and their propellant typically are more massive than lower thrust electric thrusters. Moreover, the candidate payload designs in a stack may lead to an excessively high center of mass if chemical propulsion is used, which may force a switch to electric propulsion. However, electrical propulsion leads to long orbit raising time that may be undesirable to the candidate customers. Electric orbit raising can be shortened by firing more electric thrusters simultaneously, but this requires a larger than normal power subsystem. Some types of commercial payloads require larger power subsystems so that they can also support a larger electric propulsion subsystem. Therefore, there is a trade-off between time of flight and mass.

DETAILED DESCRIPTION

Technology is disclosed herein for orbit raising of multiple spacecraft that were launched with a single launch vehicle. In an embodiment, two or more spacecraft are configured in a stacked launch configuration in which a lower spacecraft is mechanically coupled with a payload adapter of a launch vehicle with one or more upper spacecraft above the lower spacecraft. Propellant that is stored in the lower spacecraft during a launch phase is transferred to an upper spacecraft in the stack after the launch phase. The propellent may be used by the upper spacecraft for an orbit raising maneuver that raises the orbit of at least the upper spacecraft from a first orbit to a second orbit. Storing the propellant in the lower spacecraft lowers the center of mass of the stack during launch. Lowering the center of mass reduces the structural bending moment of the stack during launch. A lower center of mass at launch allows a larger total launch mass. The larger total launch mass allows the spacecraft and/or the structure that supports the spacecraft on launch to be fortified. Therefore, the risk of damage to the spacecraft during launch is reduced. Alternatively, lowering the center of mass of the propellant allows the dry mass of the payload to be placed higher in the stack, which may improve payload operation.

In an embodiment, the system deploys an upper spacecraft and a lower spacecraft from a launch vehicle into a parking orbit following the launch phase. The system transfers propellant by way of a propellant line arrangement, subsequent to the launch phase, from a first propellant storage of the lower spacecraft to a second propellant storage of the upper spacecraft. The system operates a thruster of the upper spacecraft using the propellant that the system transferred to the upper spacecraft subsequent to the launch phase. The thruster of the upper spacecraft may be used for an orbit raising maneuver that raises the orbit of at least the upper spacecraft. In one embodiment, the orbit raising maneuver raises at least the upper spacecraft to a higher orbit (e.g., mission orbit) than the parking orbit. Many other orbit raising maneuvers using the propellent that was transferred from the lower spacecraft to the upper spacecraft are disclosed herein.

Figure 1:
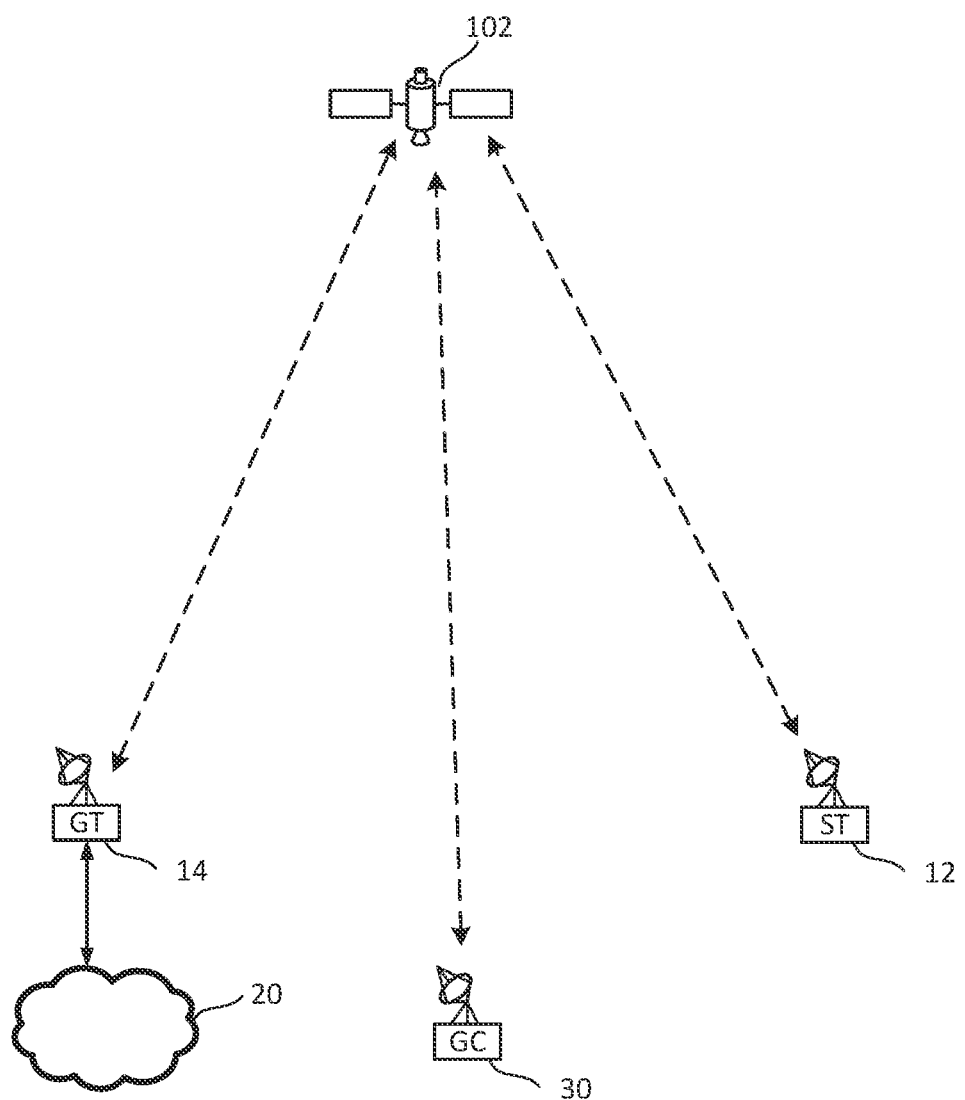
FIG. 1 is a block diagram of a spacecraft system.

FIG. 1 is a block diagram of a spacecraft system. The system of FIG. 1 includes spacecraft 102, subscriber terminal 12, gateway 14, and ground control terminal 30. Subscriber terminal 12, gateway 14, and ground control terminal 30 are examples of ground terminals. In one embodiment, spacecraft 102 is a satellite; however, spacecraft 102 can be other types of spacecraft. Spacecraft 102 may be in a mission orbit, such as a geostationary or non-geostationary orbital location. Technology disclosed herein may be used for launching the spacecraft 102 with at least one other spacecraft 102 in the same launch vehicle and raising the orbit of the spacecraft 102.

Spacecraft 102 is communicatively coupled by at least one wireless feeder link to at least one gateway terminal 12 and by at least one wireless user link to a plurality of subscriber terminals (e.g., subscriber terminal 12) via an antenna system. Gateway terminal 14 is connected to the Internet 20. The system allows spacecraft 102 to provide internet connectivity to a plurality of subscriber terminals (e.g., subscriber terminal 12) via gateway 14. Ground control terminal 30 is used to monitor and control operations of spacecraft 102. Spacecraft can vary greatly in size, structure, usage, and power requirements, but when reference is made to a specific embodiment for the spacecraft 102, the example of a communication satellite will often be used in the following, although the techniques are more widely applicable, including other or additional payloads such as for an optical satellite.

Figure 2:
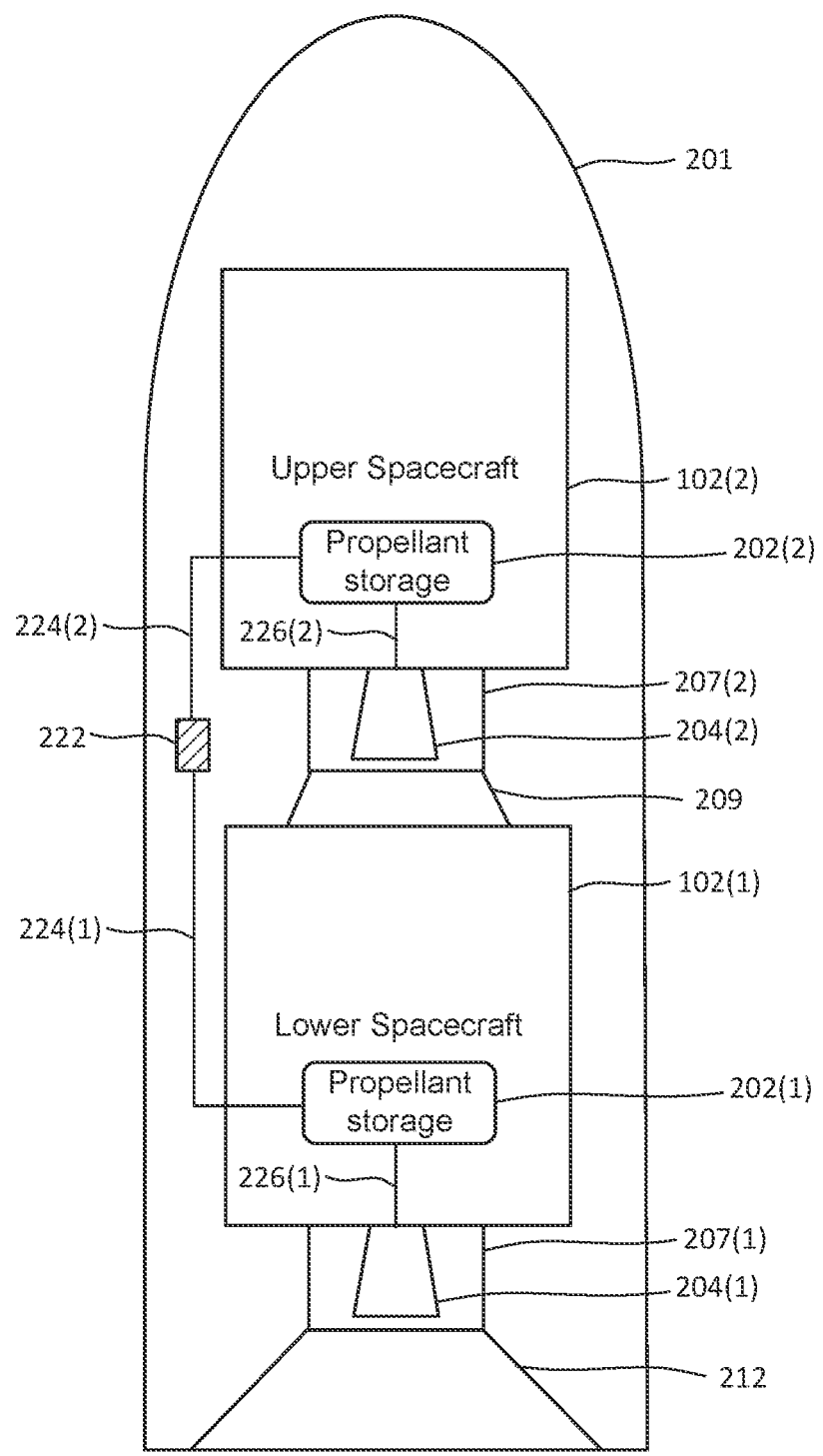
FIG. 2 illustrates an embodiment of two spacecraft configured as a stack to be launched within a common fairing of a launch vehicle.

FIG. 2 illustrates an embodiment of two spacecraft mechanically coupled together in a stack to be launched within a common fairing 201 of a launch vehicle (not illustrated). The configuration in FIG. 2 may be referred to as a launch configuration. A lower spacecraft 102(1) includes an adapter 207(1) that is mechanically coupled, in the launch configuration, with a primary payload adapter 212 that may be part of an upper stage (not illustrated) of the launch vehicle. The lower spacecraft 102(1) includes an inter-spacecraft coupling arrangement 209 (also referred to as an inter-satellite coupling arrangement) that is mechanically coupled, in the launch configuration, with an adapter 207(2) of an upper spacecraft 102(2). The stack may have more than two spacecraft mechanically coupled together. For example, there could be a third spacecraft that is above and mechanically coupled to the upper spacecraft 102(2). Herein, the phrase "spacecraft mechanically coupled together in a stack" means that each spacecraft will be mechanically coupled to at least one other spacecraft. However, it is not required that each spacecraft be mechanically coupled to every other spacecraft in the stack.

Each spacecraft 102 includes one or more on-board propulsion subsystems. In one embodiment, the on-board propulsion subsystem of a spacecraft may be used for orbit raising from, for example, a parking orbit. This orbit raising could raise the orbit of one or both of the spacecraft 102(1), 102(2). In one embodiment, an on-board propulsion subsystem may also perform station-keeping to maintain an orbit of a spacecraft. In one embodiment, an on-board propulsion subsystem may also be used for attitude control/momentum management purposes. The on-board propulsion subsystems of the lower spacecraft includes propellant storage 202(1) and a thruster 204(1), which are connected by a propellant line 226(1). The on-board propulsion subsystem of the upper spacecraft 102(2) includes propellant storage 202(2) and a thruster 204(2), which are connected by a propellant line 226(2).

Technology is disclosed herein for configuring and operating the on-board propulsion subsystems so as to lower the center of mass of the stack in the launch configuration. In an embodiment, propellant is distributed unequally between the two spacecraft so as to lower the center of mass of the stack. In one embodiment, most or all propellant, at the time of launch, is stored in the lower spacecraft 102(1). Subsequent to launch, at least some of the propellant is transferred from the lower spacecraft 102(1) to the upper spacecraft 102(2) so that each spacecraft has an amount of propellant needed to complete its respective mission. In an embodiment, sufficient propellant is transferred to the upper spacecraft 102(2) for orbit raising of the upper spacecraft 102(2), as well as maintaining the orbit the upper spacecraft 102(2). In an embodiment, at least a portion of the orbit raising of the lower spacecraft 102(1) is performed using the on-board propulsion subsystem of the upper spacecraft 102(2) using propellant that was transferred to the upper spacecraft 102(2) from the lower spacecraft 102(1). In an embodiment, at least a portion of the orbit raising of the upper spacecraft 102(2) is performed using the on-board propulsion subsystem of the lower spacecraft 102(1).

Referring to FIG. 2, propellant from the lower spacecraft 102(1) may be transferred to the upper spacecraft 102(2) by way of propellant lines and propellant line coupling devices. More particularly, propellant line 224(1), coupling device 222, and propellant line 224(2) couple a port of propellant storage 202(1) of the lower spacecraft 102(1) with a port of propellant storage 202(1) of the upper spacecraft 102(2). Therefore, propellant from the propellant storage 202(1) of the lower spacecraft 102(1) may be transferred to the propellant storage 202(2) of the upper spacecraft 102(2) subsequent to launch and prior to orbit raising. Thus, at least some of the propellant that will be used by upper spacecraft 102(2) is stored at launch in propellant storage 202(1) of the lower spacecraft 102(1). In one embodiment, the propellant storage 202(2) of the upper spacecraft 102(2) is empty at launch, although the propellant storage 202(2) can store some propellent at launch. Therefore, the center of mass of the spacecraft stack, in the launch configuration, may be lowered significantly thereby reducing structural bending moment. Reducing the structural bending moment at launch allows a higher overall spacecraft launch mass.

In some implementations, the coupling device 222 may be or include a line disconnect. An example of a line disconnect appropriate for use cases contemplated by the present disclosure is described in NASA Technical Memorandum 100755 (Glubke, "Engineering Test Results for the Moog Single Line Disconnect", Goddard Space Flight Center, 1990) the disclosure of which is hereby incorporated by reference in its entirety into the present application. In some implementations, the coupling device 222 may include a line disconnect including a proximal portion and a distal portion, each of the proximal portion and the distal portion including a respective valving element. The valving elements may be configured to permit propellant flow when the distal portion and the proximal portion are mutually engaged and prevent propellant flow when the distal portion and the proximal portion are detached.

Figure 3A:
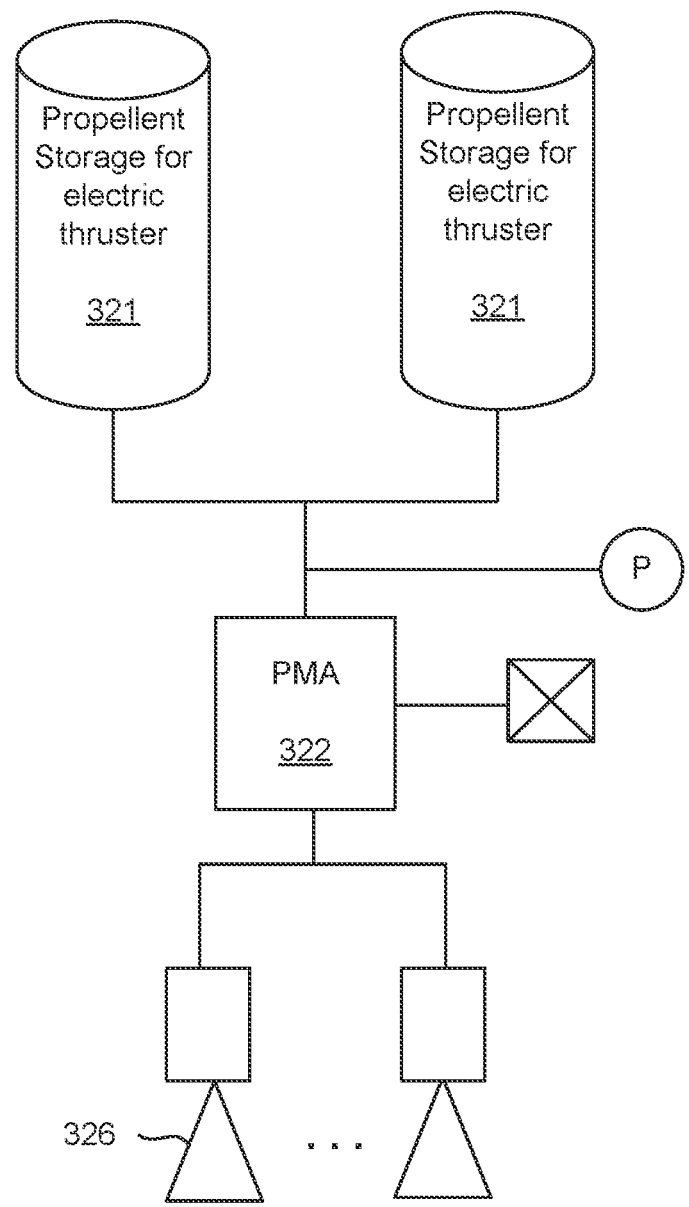
FIG. 3A illustrates an example of an electric propulsion subsystem that may be used in a spacecraft.

In some embodiments, the lower spacecraft 102(1) and the upper spacecraft 102(2) each have an electric propulsion subsystem. FIG. 3A illustrates an example of an electric propulsion subsystem that may be used in a spacecraft 102. The electric on-board propulsion subsystem may include any number of electric thrusters 326 manifolded by way of a propellant management assembly (PMA) 322 with propellant tanks 321. Propellant such as Xenon (Xe) stored in tanks 321 at a high pressure may be reduced in pressure by the PMA 322 and delivered to the electric thrusters 326. In an embodiment, propellant storage 202(1) includes one or more Xe tanks 321, and propellant storage 202(2) includes one or more Xe tanks 321. At launch, all or most of the Xe may be stored in propellant storage 202(1). Some of the Xe is transferred from propellant storage 202(1) to propellant storage 202(2) after launch. Propellants other than Xe may be used in the electric propulsion subsystem. For example, a different high atomic number, easily ionized, inert gas may be used as a propellant.

The electric thruster 326 may be, for example a Hall accelerator, a gridded electrostatic accelerator, a cross field (E×B) accelerator, a pulsed plasma thruster, a pulsed inductive thruster, a field-reversed configuration plasma thruster, a Wakefield accelerator, a traveling wave accelerator, and an ion cyclotron resonance heater combined with a magnetic nozzle. In some embodiments, the electric thrusters are used during orbit raising.

Note that for some launch configurations, there is a significant difference in DC power generation between the upper and lower spacecraft. For example, a direct to home (DTH) satellite may have a large DC power system, whereas a high throughput satellite (HTS) may have a smaller DC power system. However, the HTS may have a higher mass than the DTH satellite. This DC power generation difference impacts the ability to use an electric propulsion subsystem for orbit raising. In one launch configuration the lower spacecraft 102(1) has a relatively large mass, but has a relatively small DC power subsystem. On the other hand, the upper spacecraft 102(2) has smaller mass, but has a relatively large DC power subsystem. The relatively large DC power subsystem of the upper spacecraft 102(2) may allow for efficient orbit raising of at least the upper spacecraft 102(2), using an electric propulsion subsystem. In particularly, a large DC power subsystem can help to decrease the time of flight for orbit raising. However, the relatively small DC power subsystem of the lower spacecraft 102(1) may restrict the orbit raising ability of the electric propulsion subsystem of the lower spacecraft 102(1), which could lead to a longer time of flight.

Figure 3B:
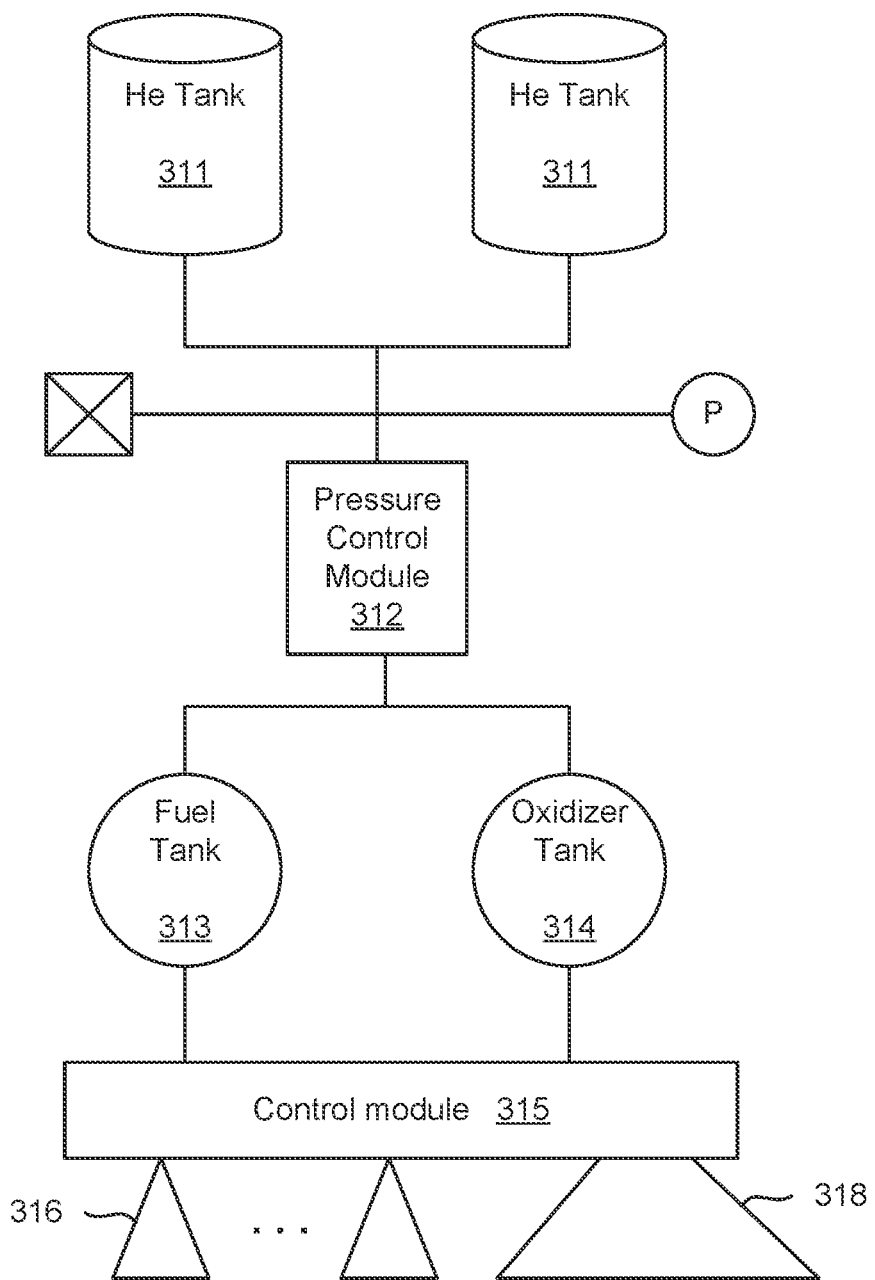
FIG. 3B illustrates an example of a chemical propulsion subsystem that may be used in a spacecraft.

FIG. 3B illustrates an example of a chemical propulsion subsystem that may be used in a spacecraft 102. FIG. 3B depicts an example of a chemical onboard propulsion subsystem configured to include bipropellant thrusters. The chemical propulsion subsystem may include any number of low thrust chemical thrusters 316 and/or a main satellite thruster (MST) 318 manifolded by way of a control module 315 with fuel tank 313 and oxidizer tank 314. The fuel tank 313 and the oxidizer tank 314 may each be loaded with a desired quantity of liquid propellant, and include an ullage volume, gaseous pressure of which may be regulated by a pressure control module 312. For example the pressure control module 312 may include one or more pressure regulators. Helium (He) stored in pressurant tanks 311 at a high pressure may be reduced in pressure by the pressure control module 312 and delivered to the fuel tank 313 and the oxidizer tank 314.

In an embodiment, propellant storage 202(1) of the lower spacecraft 102(1) includes one or more He tanks 311, one or more Fuel tanks 313, and one or more Oxidizer tanks 314. In some embodiments, propellant storage 202(2) of the upper spacecraft 102(2) also includes one or more He tanks 311, one or more Fuel tanks 313, and one or more Oxidizer tanks 314. Numerous examples are described below in which the propellant that is transferred from the lower spacecraft 102(1) to the upper spacecraft 102(2) is propellent for an electric propulsion subsystem. However, in some embodiments, propellant that is transferred from the lower spacecraft 102(1) to the upper spacecraft 102(2) is propellent for a chemical propulsion subsystem. In one embodiment, the lower spacecraft 102(1) has both a chemical propulsion subsystem and an electric propulsion subsystem; however, the upper spacecraft 102(1) has an electric propulsion subsystem but does not have a chemical propulsion subsystem. This configuration provides for a low center of mass in the launch configuration, and also allows the chemical propulsion subsystem of the lower spacecraft 102(1) to perform at least part of the orbit raising of the lower spacecraft 102(1) and optionally perform at least part of the orbit raising of the upper spacecraft 102(2). Using the chemical propulsion subsystem of the lower spacecraft 102(1) for at least part of the orbit raising can reduce the time of flight for the lower spacecraft 102(1) and optionally the upper spacecraft 102(2), without raising the center of mass of the spacecraft stack in the launch configuration.

Figure 4A:
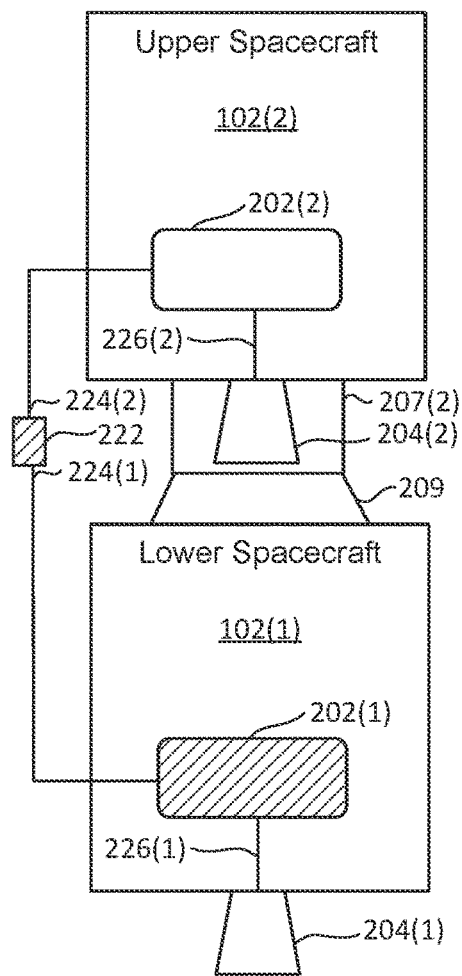
FIGS. 4A and 4B illustrate one embodiment of the transfer of propellant from a lower spacecraft to an upper spacecraft.
Figure 4B:
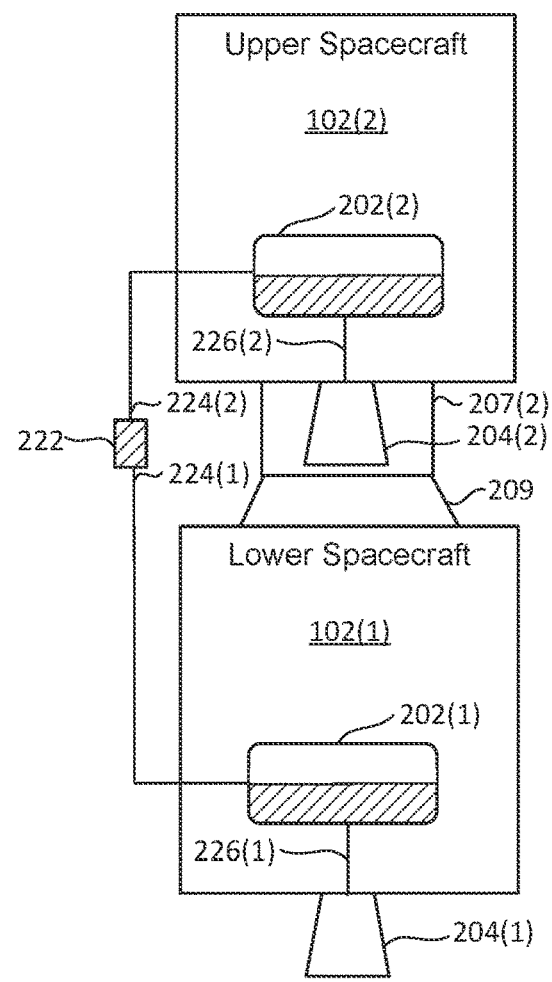

FIGS. 4A and 4B illustrate one embodiment of the transfer of propellent from a lower spacecraft to an upper spacecraft. FIG. 4A depicts an embodiment of the launch configuration in which propellant storage 202(2) of the upper spacecraft 102(2) is empty and propellant storage 202(1) of the lower spacecraft 102(1) contains significantly more propellant than is needed by the lower spacecraft 102(1) to complete its mission. FIG. 4A has similar elements depicted in FIG. 2; however, the fairing 201, payload adapter 212, and adapter 207(1) are not depicted in FIG. 4A to simplify the drawing. FIG. 4B depicts a configuration after a launch phase in which some propellant from propellant storage 202(1) of the lower spacecraft 102(1) has been transferred to propellant storage 202(2) of the upper spacecraft 102(2). In an embodiment, the propellant is transferred after the launch vehicle has reached a parking orbit, but prior to deploying the spacecraft 102 from the launch vehicle. In an embodiment, the propellant is transferred after the spacecraft 102 have been deployed from the launch vehicle into a parking orbit, but prior to orbit raising of the spacecraft 102. Note that the terms "lower spacecraft" and "upper spacecraft" refer to the original launch configuration and not the orientation with respect to the Earth's gravitational field after deployment.

In an embodiment, the system deploys the upper spacecraft 102(2) and the lower spacecraft 102(1) from the launch vehicle into a parking orbit after launch. Each spacecraft may be raised from the parking orbit to a mission orbit. In an embodiment, the thruster 204(2) of the upper spacecraft 102(2) is operated using propellant from the propellant storage 202(2) that the system transfers subsequent to launch from the propellant storage 202(1) for an orbit raising maneuver that raises at least the upper spacecraft 102(2) to a higher orbit. In one embodiment, the orbit raising maneuver raises at least the upper spacecraft 102(2) to a higher orbit than the parking orbit.

In one embodiment, the upper spacecraft 102(2) is coupled to the lower spacecraft 102(1) during at least part of the orbit raising maneuver such that the thruster 204(2) of the upper spacecraft 102(2) is operated using propellant from the propellant storage 202(2) that the system transfers subsequent to launch from the propellant storage 202(1). Thus, the propellant transferred from propellant storage 202(1) to propellant storage 202(2) may be used to raise the orbit of both spacecraft 102(1), 102(2). For example, both spacecraft 102(1), 102(2) can be raised to a higher orbit than the parking orbit when they are coupled together.

In one embodiment, the system separates the upper spacecraft 102(2) from the lower spacecraft 102(1) prior to an orbit raising maneuver such that the propellant transferred from propellant storage 202(1) to propellant storage 202(2) is used to raise the orbit of the upper spacecraft 102(2) but not the lower spacecraft 102(1) during at least part of the orbit raising maneuvers.

Figure 5A:
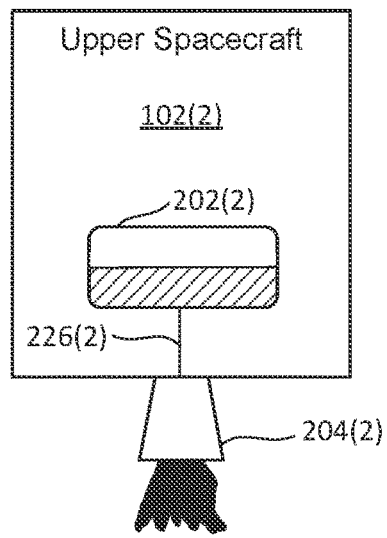
FIGS. 5A and 5B depict an embodiment in which the upper spacecraft and the lower spacecraft are separated from each other during orbit raising maneuvers.
Figure 5B:
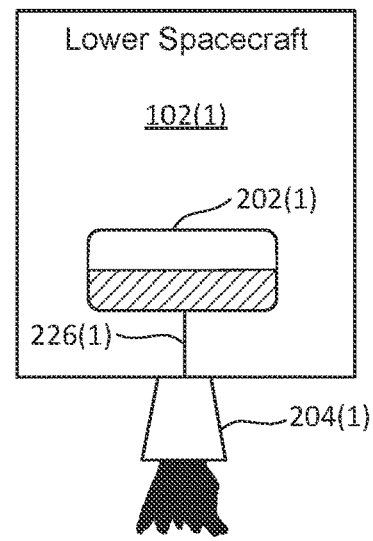

FIGS. 5A and 5B depict an embodiment in which the upper spacecraft 102(2) and the lower spacecraft 102(1) are separated from each other during orbit raising maneuvers. FIG. 5A depicts the thruster 204(2) of the upper spacecraft using the propellent in propellent storage 202(2) to raise the upper spacecraft 102(2) to a higher orbit (e.g., a mission orbit) than the parking orbit. Prior to the orbit raising, the propellent was transferred from the propellent storage 202(1) of the lower spacecraft 102(1) to the propellent storage 202(2) of the upper spacecraft 102(2). FIG. 5B depicts the thruster 204(1) of the lower spacecraft using the propellent in propellent storage 202(1) to raise the lower spacecraft 102(1) to a higher orbit (e.g., a mission orbit) than the parking orbit. The propellent that is used for this orbit raising of the lower spacecraft 102(1) was in propellent storage 202(1) in the launch configuration. In one embodiment, the on-board propulsion subsystem of the lower spacecraft 102(1) and the on-board propulsion subsystem of the upper spacecraft 102(2) are both an electric propulsion subsystem. In one embodiment, the on-board propulsion subsystem of the lower spacecraft 102(1) and the on-board propulsion subsystem of the upper spacecraft 102(2) are both a chemical propulsion subsystem.

Figure 6:
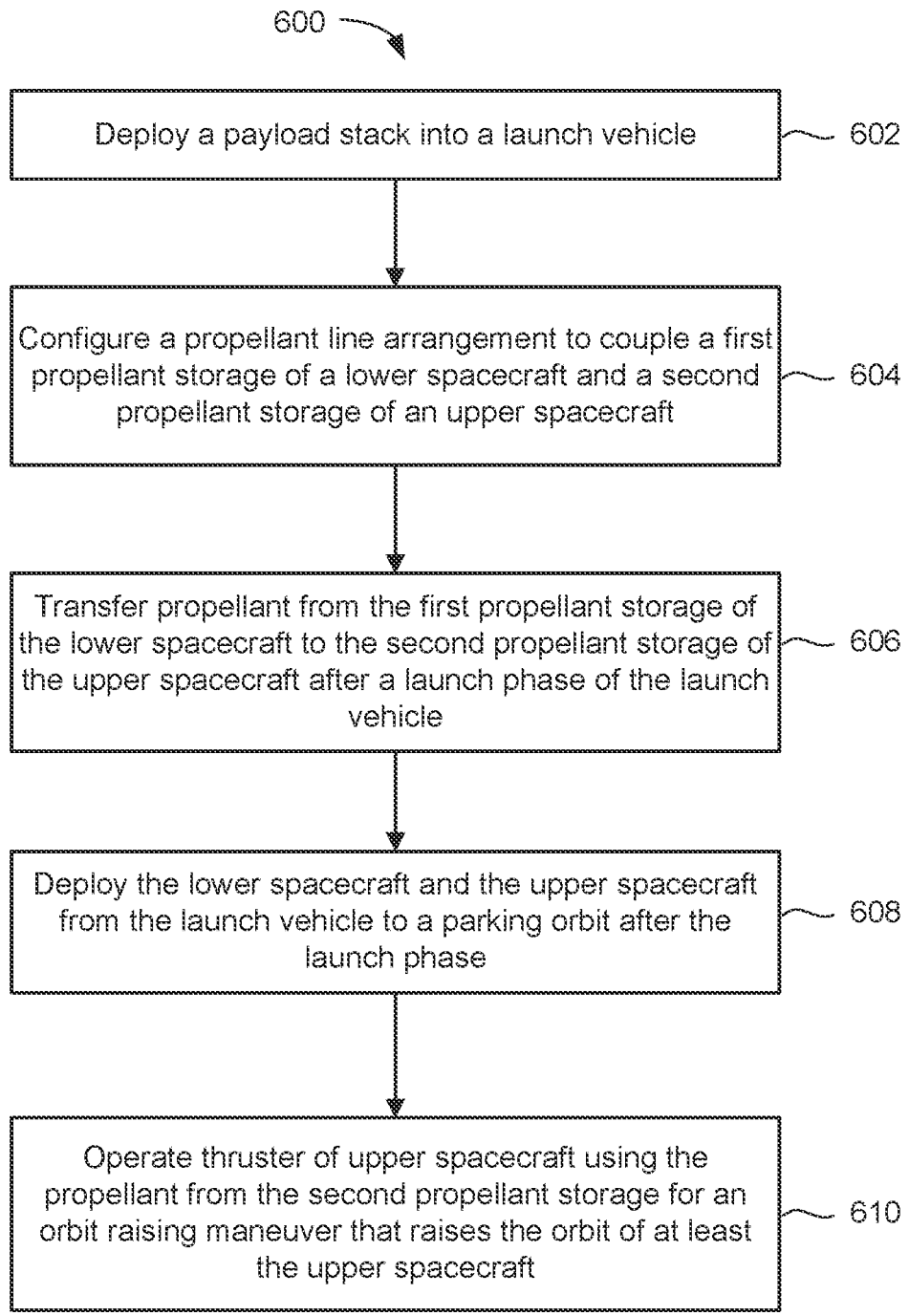
FIG. 6 is a flowchart of one embodiment of a process of launching multiple spacecraft with a single launch vehicle, and performing an orbit raising maneuver using propellant transferred from a lower spacecraft to an upper spacecraft.

FIG. 6 is a flowchart of one embodiment of a process 600 of launching multiple spacecraft with a single launch vehicle, and performing an orbit raising maneuver using propellent transferred from a lower spacecraft to an upper spacecraft. Steps 606-610 of process 600 may be performed by one or more control circuits. The one or more control circuits may include circuitry in a spacecraft 102 and/or in ground control 30. The one or more control circuits may be implemented in hardware and/or software.

Step 602 includes deploying a payload stack into a launch vehicle. The payload stack includes a lower spacecraft 102(1) and an upper spacecraft 102(2) mechanically coupled together in a stack in a launch configuration. Optionally, the payload stack may include three or more spacecraft in a stack that are mechanically coupled together in a stack in a launch configuration. Each spacecraft in the stack is mechanically coupled to at least one other spacecraft in the stack. The lower spacecraft 102(1) is mechanically coupled with a payload adapter 212 of a launch vehicle. In one embodiment, the lower spacecraft 102(1) includes an inter-spacecraft coupling arrangement 209 that is mechanically coupled, in the launch configuration, with an adapter 207(2) of the upper spacecraft 102(2). The payload stack may be placed into a fairing 201 of the launch vehicle. FIG. 2 depicts one embodiment of the launch configuration.

Step 604 includes configuring a propellant line arrangement to couple a first propellant storage 202(1) of the lower spacecraft 102(1) and a second propellant storage 202(2) of the upper spacecraft 102(2). The lower spacecraft 102(1) has a first propulsion subsystem that includes the first propellant storage 202(1) and a first thruster 204(1). The upper spacecraft 102(2) has a second propulsion subsystem that includes the second propellant storage 202(2) and a second thruster 204(2).

Step 606 includes transferring propellant by way of the propellant line arrangement from the first propellant storage 202(1) to the second propellant storage 202(2) after a launch phase of the launch vehicle. In an embodiment, step 606 is performed after the launch phase has raised the launch vehicle to a parking orbit. Process 600 allows the center of mass of the stack to be lower during the launch phase. In one embodiment, the center of mass is lowered by about 0.4 meters. Lowering the center of mass reduces the structural bending moment on launch, which protects the spacecraft 102. In an embodiment, one or more control circuits in the lower spacecraft 102(1) and/or the upper spacecraft 102(2) control the transfer of the propellant.

Step 608 includes deploying the lower spacecraft 102(1) and the upper spacecraft 102(2) from the launch vehicle to a parking orbit after the launch phase. The lower spacecraft 102(1) and the upper spacecraft 102(2) may remain mechanically coupled together after deployment, or may be separated from each other after deployment. In one embodiment, step 606 is performed prior to step 608. In one embodiment, step 606 is performed after step 608. In an embodiment, one or more control circuits in the lower spacecraft 102(1) and/or the upper spacecraft 102(2) control the deployment.

Step 610 includes operating the second thruster of the upper spacecraft 102(2) using the propellant from the second propellant storage 202(2) that was transferred subsequent to launch from the first propellant storage 202(1) for an orbit raising maneuver that raises an orbit of at least the upper spacecraft 102(2). In one embodiment, the orbit raising maneuver raises the orbit of both the upper spacecraft 102(2) and the lower spacecraft 102(1). Numerous embodiments of step 610 are discussed below. In an embodiment, one or more control circuits in the upper spacecraft 102(2) controls the second thruster.

In one embodiment, the lower spacecraft 102(1) has both an electric propulsion subsystem and a chemical propulsion subsystem. In one embodiment, the chemical propulsion subsystem is used for orbit raising to reduce the time of flight for both the lower spacecraft and the upper spacecraft. The time of flight refers to the time to raise the spacecraft from a parking orbit to a mission orbit.

Figure 7:
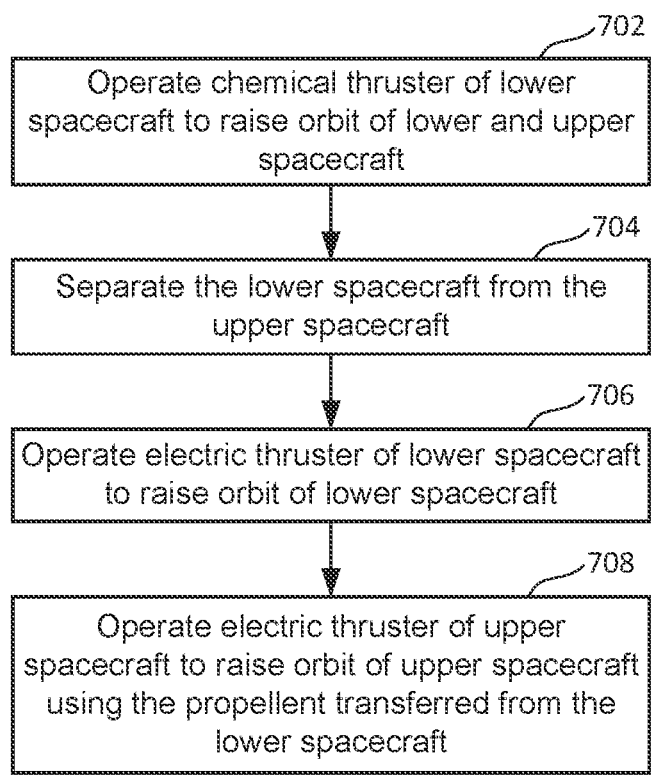
FIG. 7 is a flowchart of one embodiment of a process of operating thrusters to raise orbits of multiple spacecraft.
Figure 8A:
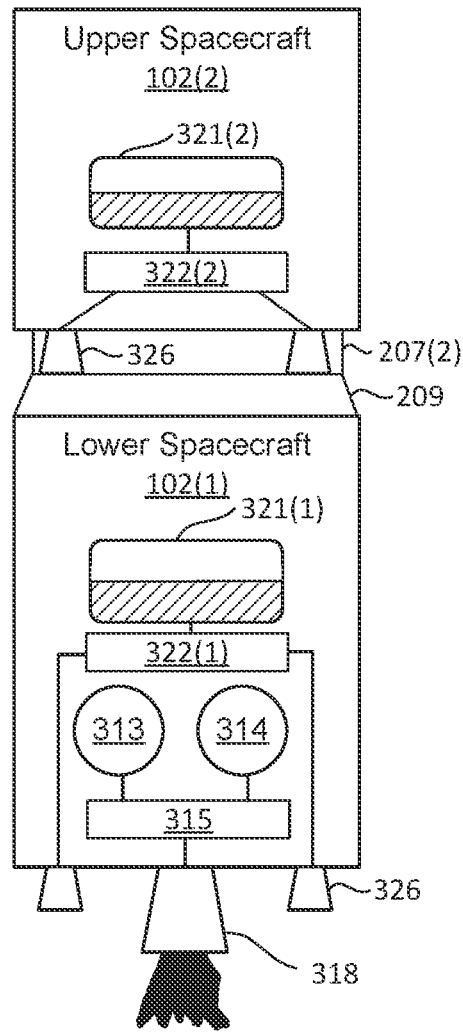
FIGS. 8A, 8B, and 8C depict one embodiment of firing of thrusters to raise the orbits in the process of FIG. 7.
Figure 8B:
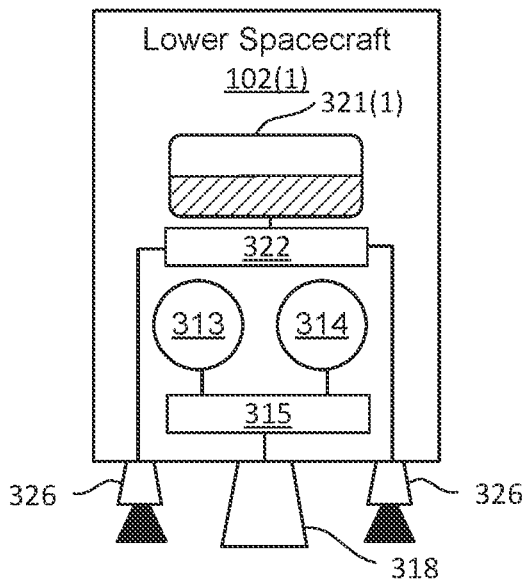
Figure 8C:
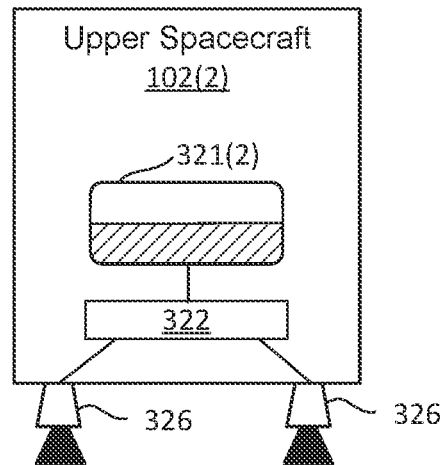

FIG. 7 is a flowchart of one embodiment of a process of operating thrusters to raise orbits of the multiple spacecraft. FIGS. 8A-8C depict one embodiment of firing of thrusters to raise the orbits in the process of FIG. 7. Step 702 includes operating a chemical thruster of the lower spacecraft 102(1) to raise the orbit of both the lower spacecraft 102(1) and the upper spacecraft 102(2). The spacecraft remain mechanically coupled to each other during step 702. FIG. 8A depicts the firing of the chemical thruster 318 of the lower spacecraft 102(1) to raise the orbit of both the upper spacecraft 102(2) and the lower spacecraft 102(1). In an embodiment, the upper spacecraft 102(2) and the lower spacecraft 102(1) are raised to a higher orbit than a parking orbit at which the upper spacecraft 102(2) and the lower spacecraft 102(1) were deployed from the launch vehicle. In one embodiment, the chemical thruster 318 is an MST, which substantially reduces the time-of-flight of both the lower spacecraft 102(1) and the upper spacecraft 102(2). FIG. 8A depicts the fuel tank 313, oxidizer tank 314, and control module 315 of the chemical propulsion subsystem. Other elements of the chemical propulsion subsystem are not depicted in FIG. 8A.

Step 704 includes mechanically separating the lower spacecraft from the upper spacecraft. The transferring of the propellent from the lower spacecraft 102(1) to the upper spacecraft 102(2) occurs prior to this separation. The transferring of the propellent from the lower spacecraft 102(1) to the upper spacecraft 102(2) may occur prior to or after step 702. The propellent that is transferred is for an electric propulsion subsystem. In one embodiment, the propellent is Xenon. The transferring of the propellant was discussed in step 606 of process 600, but is not depicted in the process of FIG. 7.

Step 706 includes operating an electric thruster of the lower spacecraft 102(1) to raise the orbit of the lower spacecraft 102(1). FIG. 8B depicts the firing of the electric thruster(s) 326 of the lower spacecraft 102(1) to raise the orbit of the lower spacecraft 102(1). In one embodiment, the lower spacecraft 102(1) is raised to a mission orbit. In an embodiment, the propellent used in step 706 was in the storage 321(1) of the lower spacecraft at launch of the launch vehicle. FIGS. 8A and 8B depict the storage for electric thruster 326(1), PMA 322, and electric thrusters 326 of the electric propulsion subsystem. Other elements of the electric propulsion subsystem are not depicted.

Step 708 includes operating an electric thruster of the upper spacecraft 102(2) to raise the orbit of the upper spacecraft 102(2). FIG. 8C depicts the firing of the electric thruster(s) 326 of the upper spacecraft 102(2) to raise the orbit of the upper spacecraft 102(2). In one embodiment, the upper spacecraft 102(2) is raised to a mission orbit. Step 708 is performed in one embodiment of step 610 of process 600. The propellent used in step 708 was in the storage 321(1) of the lower spacecraft 102(1) at launch of the launch vehicle. FIGS. 8A and 8C depict the storage for electric thruster 326(2), PMA 322, and electric thrusters 326 of the electric propulsion subsystem. Other elements of the electric propulsion subsystem are not depicted.

In one embodiment, the electric propulsion subsystem of the upper spacecraft 102(2) is used during orbit raising of both the lower spacecraft 102(1) and the upper spacecraft 102(2). Optionally, the DC power subsystem of the lower spacecraft 102(1) can be used to assist in orbit raising using the electric propulsion subsystem of the upper spacecraft 102(2), which can reduce time-of-flight. Additionally, a chemical propulsion subsystem of the lower spacecraft 102(1) may be used during an initial portion of the orbit raising of both the lower spacecraft 102(1) and the upper spacecraft 102(2).

Figure 9:
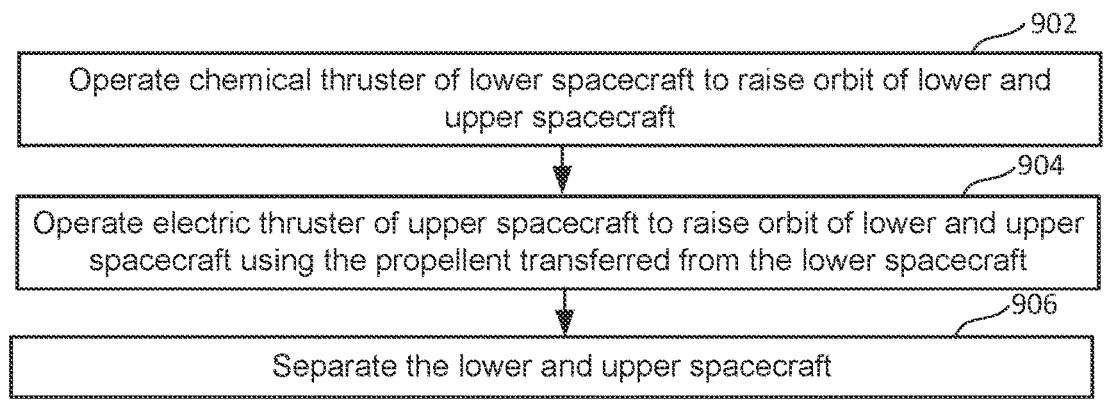
FIG. 9 is a flowchart of one embodiment of a process of using a chemical propulsion subsystem of the lower spacecraft and an electric propulsion subsystem of the upper spacecraft for orbit raising of both spacecraft.
Figure 10A:
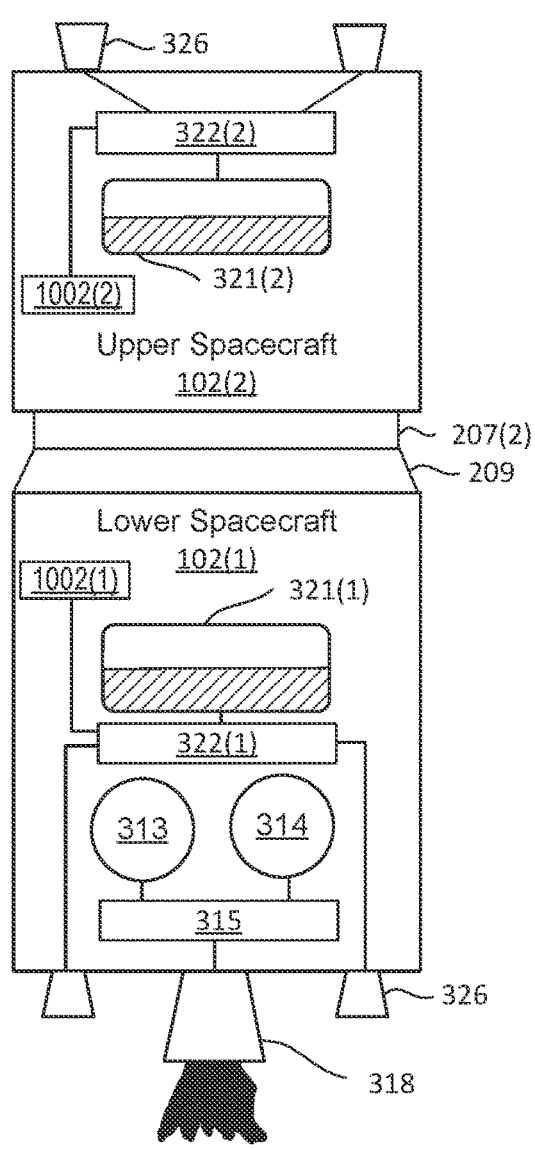
FIGS. 10A and 10B depict one embodiment of firing of thrusters to raise the orbits in the process of FIG. 9.
Figure 10B:
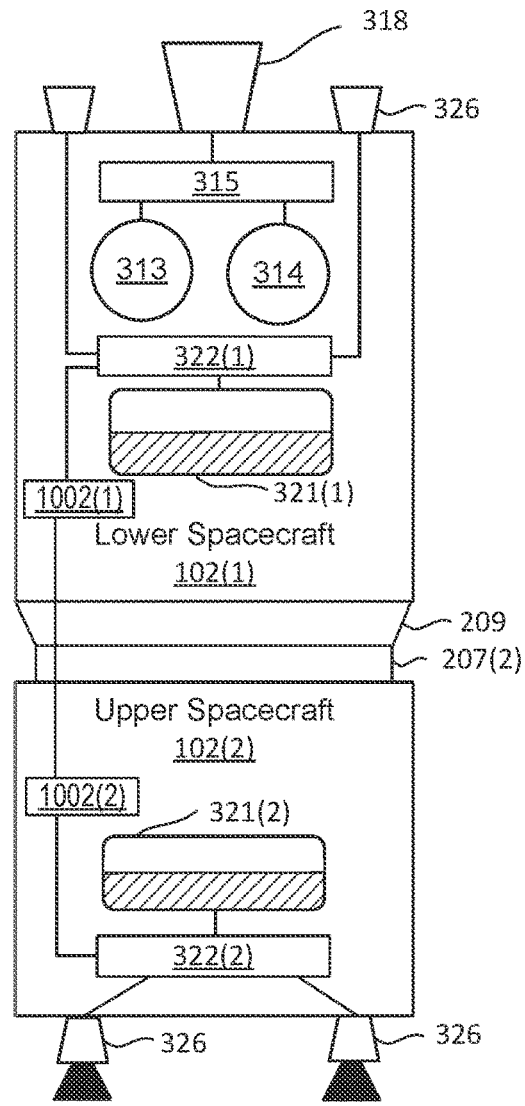

FIG. 9 is a flowchart of one embodiment of a process of using a chemical propulsion subsystem of the lower spacecraft 102(1) and an electric propulsion subsystem of the upper spacecraft 102(2) for orbit raising of both spacecraft 102(1), 102(2). FIGS. 10A and 10B depict one embodiment of firing of thrusters during orbit raising, and will be discussed in connection with FIG. 9. Step 902 in FIG. 9 includes operating a chemical thruster of the lower spacecraft 102(1) to raise the orbit of both the lower spacecraft 102(1) and the upper spacecraft 102(2). The spacecraft remain mechanically coupled to each other during step 902. FIG. 10A depicts the firing of the chemical thruster 318 of the lower spacecraft 102(1) to raise the orbit of both the upper spacecraft 102(2) and the lower spacecraft 102(1). In an embodiment, the upper spacecraft 102(2) and the lower spacecraft 102(1) are raised to a higher orbit than a parking orbit at which the upper spacecraft 102(2) and the lower spacecraft 102(1) were deployed from the launch vehicle. In one embodiment, the chemical thruster 318 is an MST, which substantially reduces the time-of-flight of both the lower spacecraft 102(1) and the upper spacecraft 102(2).

FIG. 10A also depicts components of an electric propulsion subsystem of the lower spacecraft 102(1), as well as components of an electric propulsion subsystem of the upper spacecraft 102(2). The lower spacecraft 102(1) has a DC power system 1002(1), which may be used to power its electric propulsion subsystem. The upper spacecraft 102(1) has a DC power system 1002(2), which may be used to power its electric propulsion subsystem. However, note that in step 902 the electric propulsion subsystems are not used.

Step 904 includes operating an electric thruster of the upper spacecraft 102(2) to raise the orbit of both the lower spacecraft 102(1) and the upper spacecraft 102(2). In an embodiment, the orbit raising of step 904 occurs after the orbit raising of step 902. In one embodiment, the lower spacecraft 102(1) and the upper spacecraft 102(2) are each raised to a mission orbit in step 904. FIG. 10B depicts the firing of the electric thruster(s) 326 of the upper spacecraft 102(2) to raise the orbit of both spacecraft 102(1), 102(2) while the spacecraft remain mechanically coupled to each other. In step 904, at least the DC power system 1002(2) of the upper spacecraft 102(2) is used to power the electric propulsion subsystem of the upper spacecraft 102(2). Optionally, the DC power system 1002(1) of the lower spacecraft 102(1) may be used to assist in powering the electric propulsion subsystem of the upper spacecraft 102 (2), which can reduce the time of flight. Step 904 is performed in one embodiment of step 610 of process 600. The propellent used in step 904 was in the storage 321(1) of the lower spacecraft 102(1) at launch of the launch vehicle. After step 904, the lower spacecraft 102(1) and the upper spacecraft 102(2) are separated from each other in step 906.

As noted above, the lower spacecraft 102(1) may have both an electric propulsion subsystem and a chemical propulsion subsystem. In one embodiment, the chemical propulsion subsystem is used for orbit raising of both the lower spacecraft 102(1) and the upper spacecraft (2). Then, after separating the spacecraft 102(1), 102(2), the chemical propulsion subsystem may continue to be used for orbit raising of the lower spacecraft 102(1). This technique is similar to an embodiment discussed above in connection with FIG. 7, with a difference being that instead of using the electric propulsion subsystem of the lower spacecraft 102(1) for orbit raising of the lower spacecraft 102(1) (see step 706 in FIG. 7), the chemical propulsion subsystem of the lower spacecraft 102(1) is used for orbit raising of the lower spacecraft (see step 1106 below).

Figure 11:
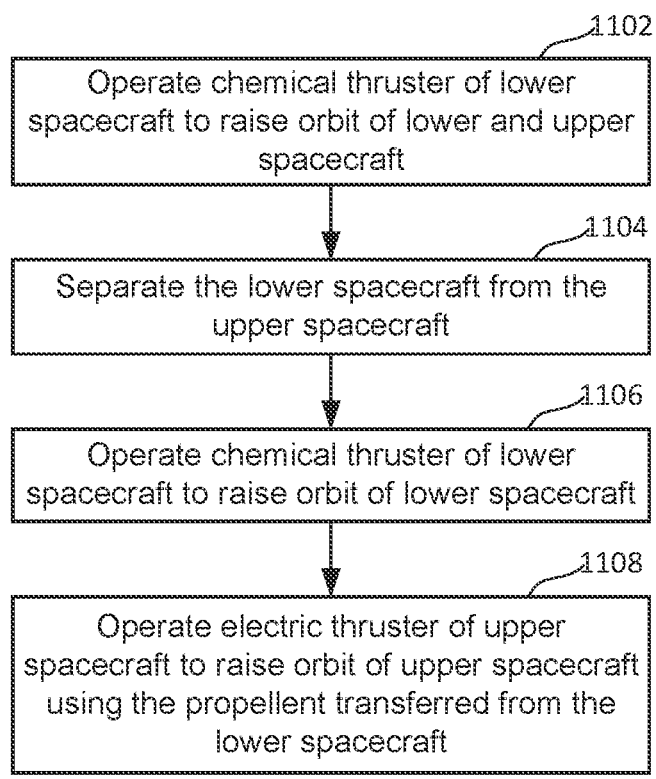
FIG. 11 is a flowchart of one embodiment of a process of operating thrusters to raise orbits of multiple spacecraft in which the chemical propulsion subsystem of the lower spacecraft is used for orbit raising of the lower spacecraft after the two spacecraft have been separated.
Figure 12A:
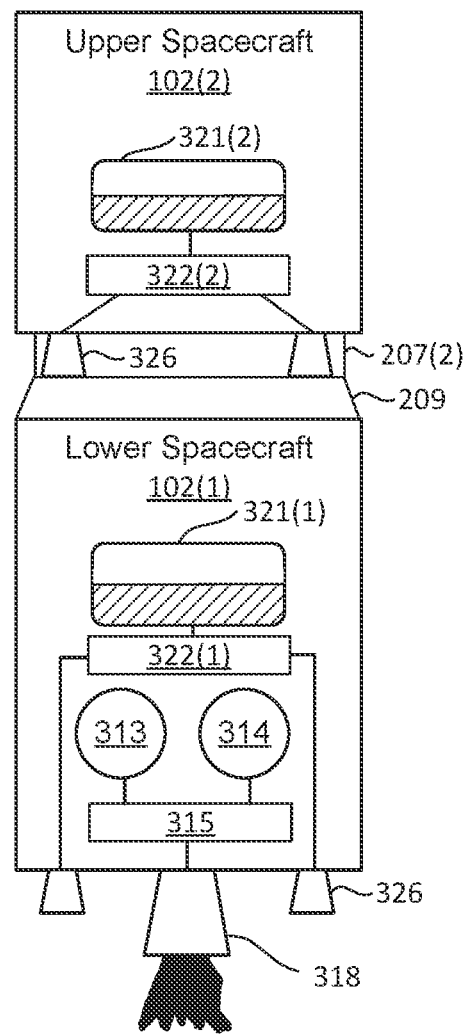
FIGS. 12A, 12B, and 12C depict one embodiment of firing of thrusters to raise the orbits in the process of FIG. 11.
Figure 12B:
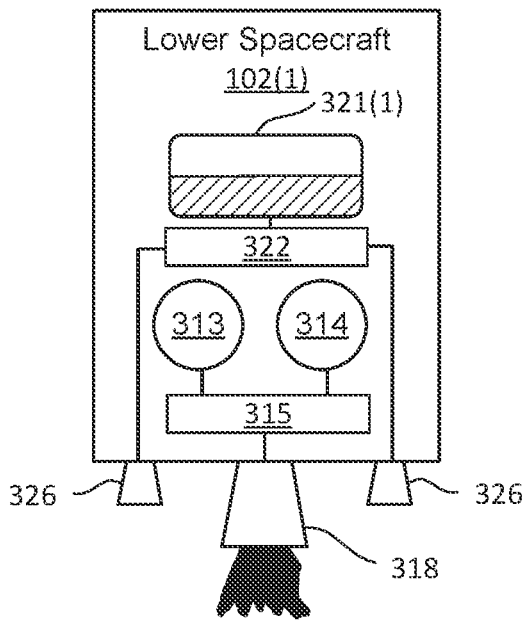
Figure 12C:
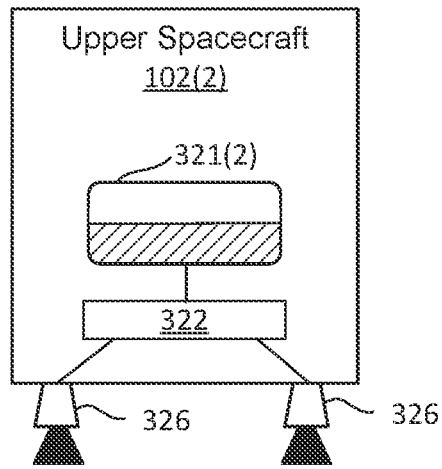

FIG. 11 is a flowchart of one embodiment of a process of operating thrusters to raise orbits of multiple spacecraft in which the chemical propulsion subsystem of the lower spacecraft 102(1) is used for orbit raising of the lower spacecraft 102(1) after the two spacecraft have been separated, which reduces time-of-flight for the lower spacecraft 102(1) relative to an embodiment of FIG. 7. FIGS. 12A-12C depict one embodiment of firing of thrusters to raise the orbits, and will be discussed in connection with FIG. 11. Step 1102 includes operating a chemical thruster of the lower spacecraft 102(1) to raise the orbit of both the lower spacecraft 102(1) and the upper spacecraft 102(2). Step 1102 may be similar to step 702 of FIG. 7, and will thus not be discussed in detail.

Step 1104 includes separating the lower spacecraft from the upper spacecraft. The transferring of the propellent from the lower spacecraft 102(1) to the upper spacecraft 102(2) occurs prior to this separation. The transferring of the propellent from the lower spacecraft 102(1) to the upper spacecraft 102(2) may occur prior to or after step 1102. The propellent that is transferred is for an electric propulsion subsystem. In one embodiment, the propellent is Xenon. The transferring of the propellant was discussed in step 606 of process 600, but is not depicted in the process of FIG. 11.

Step 1106 includes operating a chemical thruster of the lower spacecraft 102(1) to raise the orbit of the lower spacecraft 102(1). FIG. 12B depicts the firing of the chemical thruster 318 of the lower spacecraft 102(1) to raise the orbit of the lower spacecraft 102(1). In one embodiment, the lower spacecraft 102(1) is raised to a mission orbit.

Step 1108 includes operating an electric thruster of the upper spacecraft 102(2) to raise the orbit of the upper spacecraft 102(2). FIG. 12C depicts the firing of the electric thruster(s) 326 of the upper spacecraft 102(2) to raise the orbit of the upper spacecraft 102(2). In one embodiment, the upper spacecraft 102(2) is raised to a mission orbit. Step 1108 is performed in one embodiment of step 610 of process 600. The propellent used in step 1108 was in the storage 321(1) of the lower spacecraft 102(1) at launch of the launch vehicle.

Figure 13:
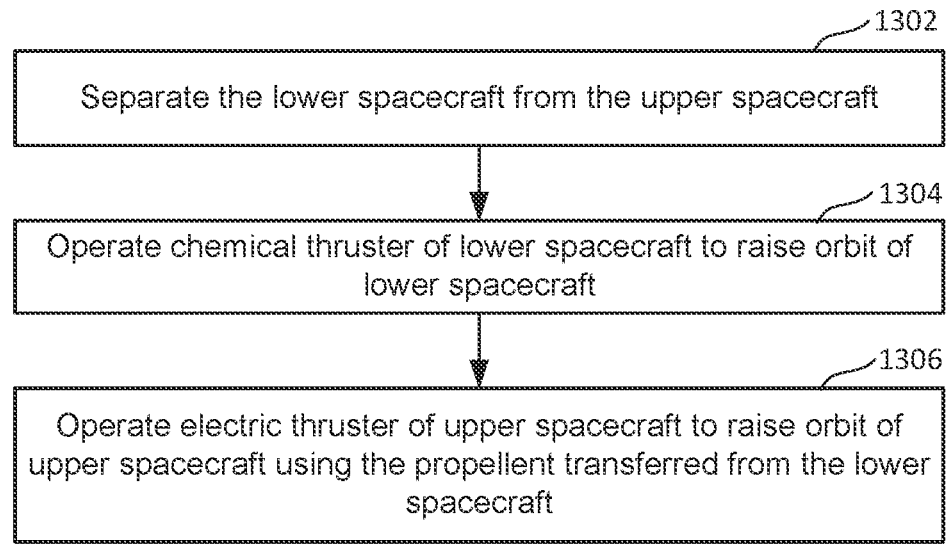
FIG. 13 is a flowchart of one embodiment of a process of operating thrusters to raise orbits of multiple spacecraft in which the chemical propulsion subsystem of the lower spacecraft is used for orbit raising of the lower spacecraft and the electric propulsion subsystem of the upper spacecraft is used for orbit raising of the upper spacecraft.
Figures 14A, 14B:
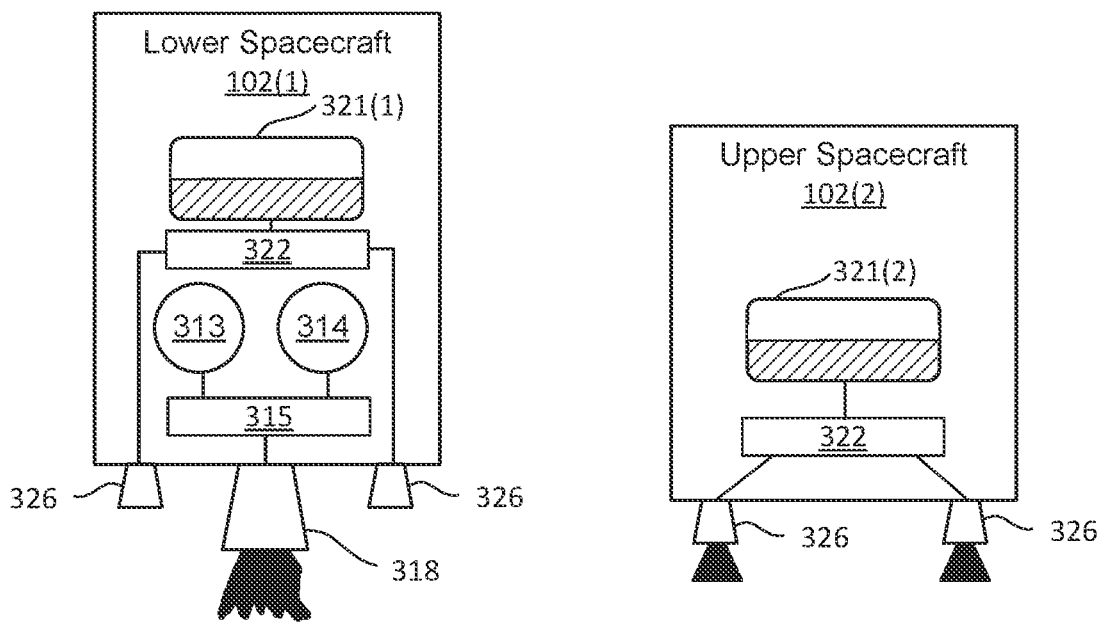
FIGS. 14A and 14B depict one embodiment of firing of thrusters to raise the orbits in the process of FIG. 13.

In some cases, it may be desirable to quickly raise the orbit of the lower spacecraft 102(1). In one embodiment, the two spacecraft 102(1), 102(2) are separated prior to orbit raising. Then, the chemical propulsion subsystem of the lower spacecraft 102(1) is used for orbit raising of the lower spacecraft 102(1) and the electric propulsion subsystem of the upper spacecraft 102(2) is used for orbit raising of the upper spacecraft 102(2). This technique is similar to an embodiment discussed above in connection with FIG. 11, with a difference being that the chemical propulsion subsystem of the lower spacecraft 102(1) is not used for joint orbit raising of both the lower spacecraft 102(1) and the upper spacecraft 102(2) (see step 1102 in FIG. 11). FIGS. 13, 14A, 14B provide further details.

FIG. 13 is a flowchart of one embodiment of a process of operating thrusters to raise orbits of multiple spacecraft in which the chemical propulsion subsystem of the lower spacecraft 102(1) is used for orbit raising of the lower spacecraft 102(1) and the electric propulsion subsystem of the upper spacecraft 102(2) is used for orbit raising of the upper spacecraft 102(2). Step 1302 includes separating the lower spacecraft from the upper spacecraft. The transferring of the propellent from the lower spacecraft 102(1) to the upper spacecraft 102(2) occurs prior to this separation. The propellent that is transferred is for an electric propulsion subsystem. In one embodiment, the propellent is Xenon. The transferring of the propellant was discussed in step 606 of process 600, but is not depicted in the process of FIG. 13.

Step 1304 includes operating a chemical thruster of the lower spacecraft 102(1) to raise the orbit of the lower spacecraft 102(1). FIG. 14A depicts the firing of the chemical thruster 318 of the lower spacecraft 102(1) to raise the orbit of the lower spacecraft 102(1). In one embodiment, the lower spacecraft 102(1) is raised from a parking orbit to a mission orbit.

Step 1306 includes operating an electric thruster of the upper spacecraft 102(2) to raise the orbit of the upper spacecraft 102(2). FIG. 14B depicts the firing of the electric thruster(s) 326 of the upper spacecraft 102(2) to raise the orbit of the upper spacecraft 102(2). In one embodiment, the upper spacecraft 102(2) is raised from a parking orbit to a mission orbit. Step 1306 is performed in one embodiment of step 610 of process 600. The propellent used in step 1306 was in the storage 321(1) of the lower spacecraft 102(1) at launch of the launch vehicle.

Figure 15:
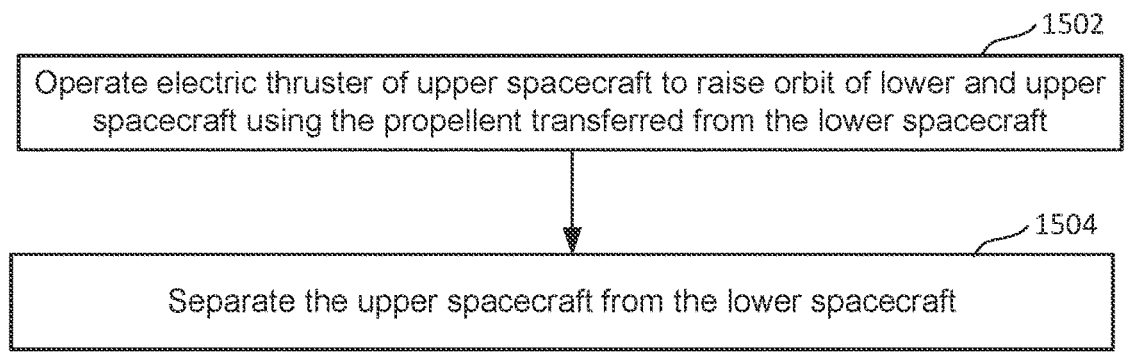
FIG. 15 is a flowchart of one embodiment of a process of using an electric propulsion subsystem of the upper spacecraft for orbit raising of both the lower and upper spacecraft.
Figure 16:
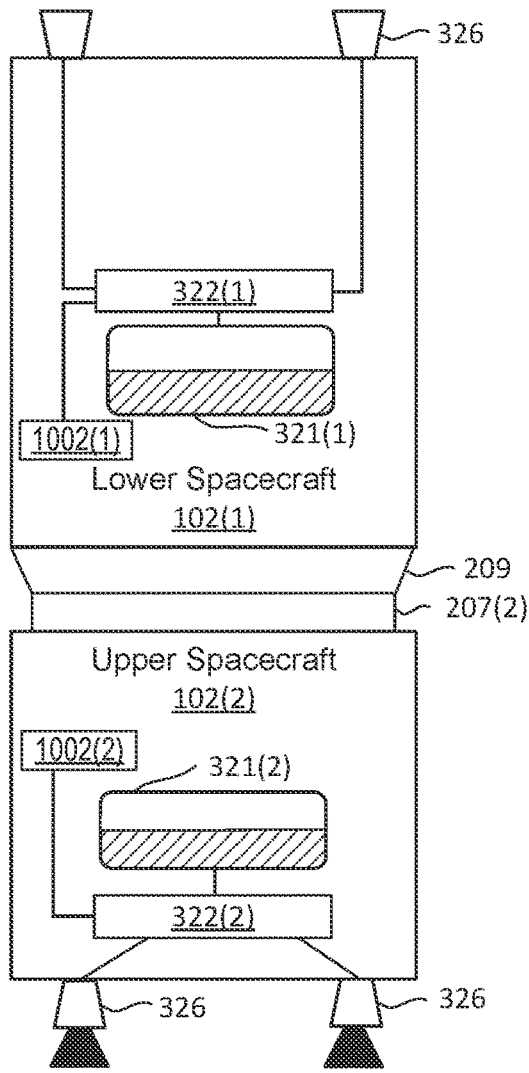
FIG. 16 depicts the firing of the electric thruster(s) of the upper spacecraft to raise the orbit of both the upper spacecraft and the lower spacecraft.

In some cases, the thrusters of the lower spacecraft 102(1) might not be compatible with orbit raising. In such cases, the electric propulsion subsystem of the upper spacecraft 102(2) may be used for all orbit raising of both the lower spacecraft 102(1) and the upper spacecraft 102(2). FIG. 15 is a flowchart of one embodiment of a process of using an electric propulsion subsystem of the upper spacecraft 102(2) for orbit raising of both spacecraft 102(1), 102(2). Step 1502 includes operating an electric thruster of the upper spacecraft 102(2) to raise the orbit of both the lower spacecraft 102(1) and the upper spacecraft 102(2). The spacecraft remain mechanically coupled to each other during step 1502. FIG. 16 depicts the firing of the electric thruster(s) 326 of the upper spacecraft 102(2) to raise the orbit of both the upper spacecraft 102(2) and the lower spacecraft 102(1). In an embodiment, the upper spacecraft 102(2) and the lower spacecraft 102(1) are raised from a parking orbit to a mission orbit. Step 1504 includes separating the upper spacecraft 102(2) from the lower spacecraft 102(1).

Figure 17A:
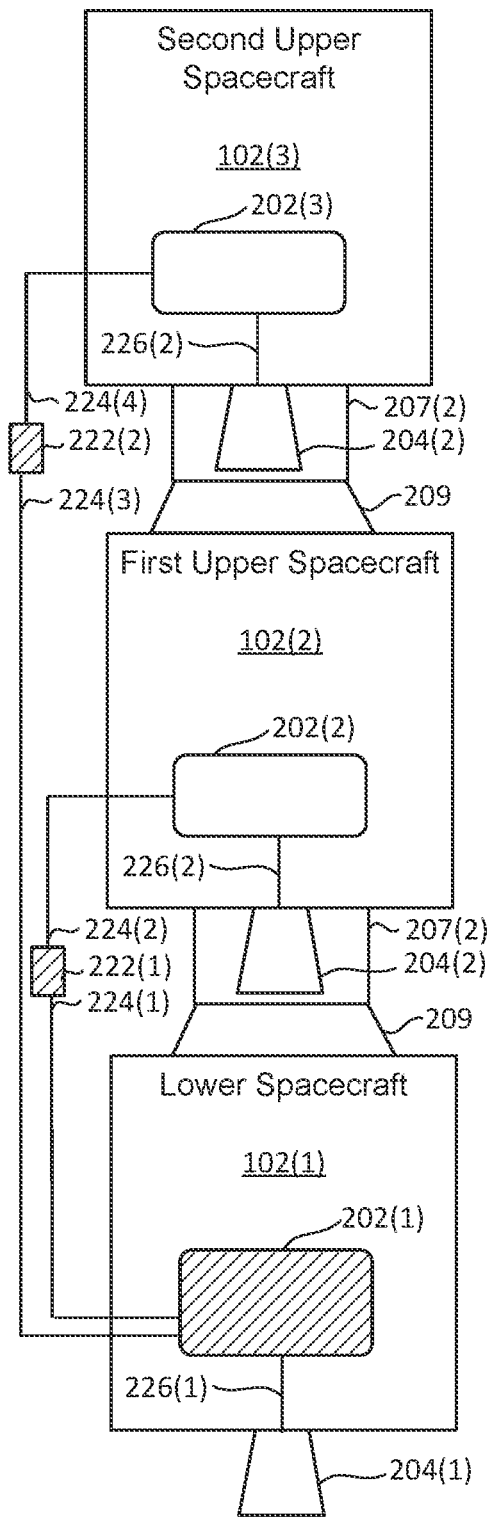
FIGS. 17A and 17B illustrate one embodiment of the transfer of propellent from a lower spacecraft to two upper spacecraft.

In some embodiments, there are more than two spacecraft 102 in the stacked launch configuration. FIG. 17A depicts one embodiment of a stacked launch configuration in which there are three spacecraft 102(1), 102(2) and 102(3). The embodiment is similar to an embodiment of FIG. 4A, but has a second upper spacecraft 102(3) above a first upper spacecraft 102(2). Propellant from the lower spacecraft 102(1) may be transferred to the second upper spacecraft 102(3) by way of propellant lines and a propellant line coupling device. More particularly, propellant line 224(3), coupling device 222(2), and propellant line 224(4) couple a port of propellant storage 202(1) of the lower spacecraft 102(1) with a port of propellant storage 202(3) of the second upper spacecraft 102(3). Therefore, propellant from the propellant storage 202(1) of the lower spacecraft 102(1) may be transferred to the propellant storage 202(3) of the second upper spacecraft 102(3) subsequent to launch and prior to orbit raising. Therefore, the center of mass of the spacecraft stack, in the launch configuration, may be lowered significantly thereby reducing structural bending moment. In one embodiment, the propellant storage 202(3) of the second upper spacecraft 102(3) and the propellant storage 202(2) of the first upper spacecraft 102(2) are both empty at launch, which lowers the center of mass relative to having propellant in storage 202(2) and/or 202(3). Lowering the center of mass reduces structural bending moment at launch.

Figure 17B:
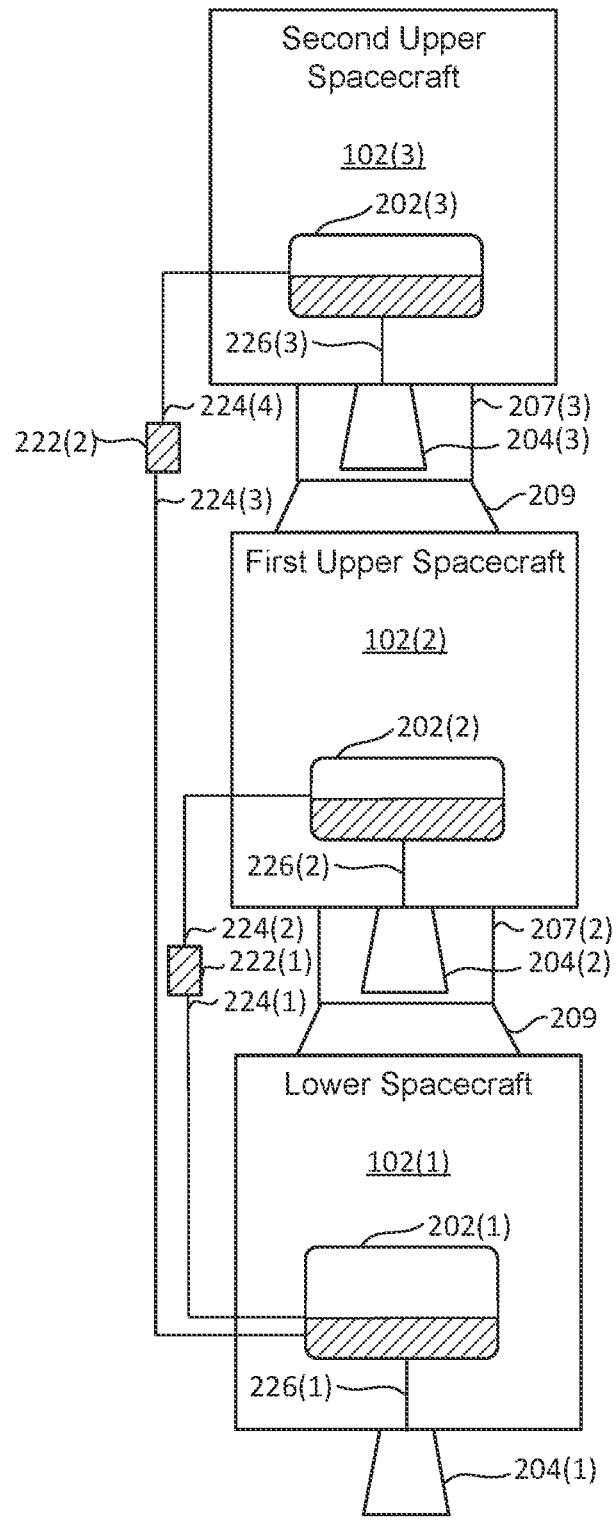

FIGS. 17A and 17B illustrate one embodiment of the transfer of propellent from the lower spacecraft 102(1) to the first upper spacecraft 102(2) and the second upper spacecraft 102(3). FIG. 17A has similar elements depicted in FIG. 2; however, the fairing 201, payload adapter 212, and adapter 207(1) are not depicted in FIG. 17A to simplify the drawing. FIG. 17B depicts a configuration after launch in which some propellant from propellant storage 202(1) of the lower spacecraft 102(1) has been transferred to propellant storage 202(2) of the first upper spacecraft 102(2) and some propellant from propellant storage 202(1) of the lower spacecraft 102(1) has been transferred to propellant storage 202 (3) of the second upper spacecraft 102(3). In an embodiment, the propellant is transferred after the launch vehicle has reached a parking orbit, but prior to deploying the spacecraft 102 from the launch vehicle. In an embodiment, the propellant is transferred after the spacecraft 102 have been deployed from the launch vehicle into a parking orbit, but prior to orbit raising of the spacecraft 102.

Figure 18A:
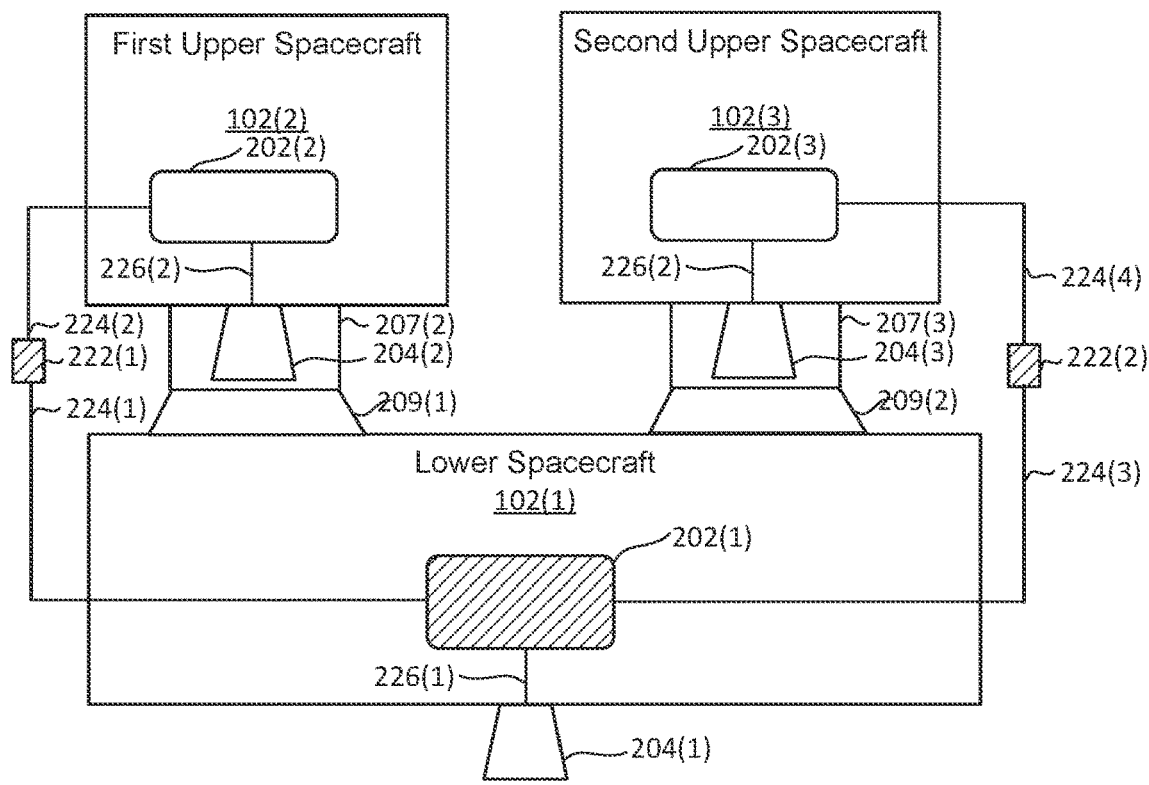
FIGS. 18A and 18B illustrate another embodiment of the transfer of propellent from the lower spacecraft to a first upper spacecraft and a second upper spacecraft.
Figure 18B:
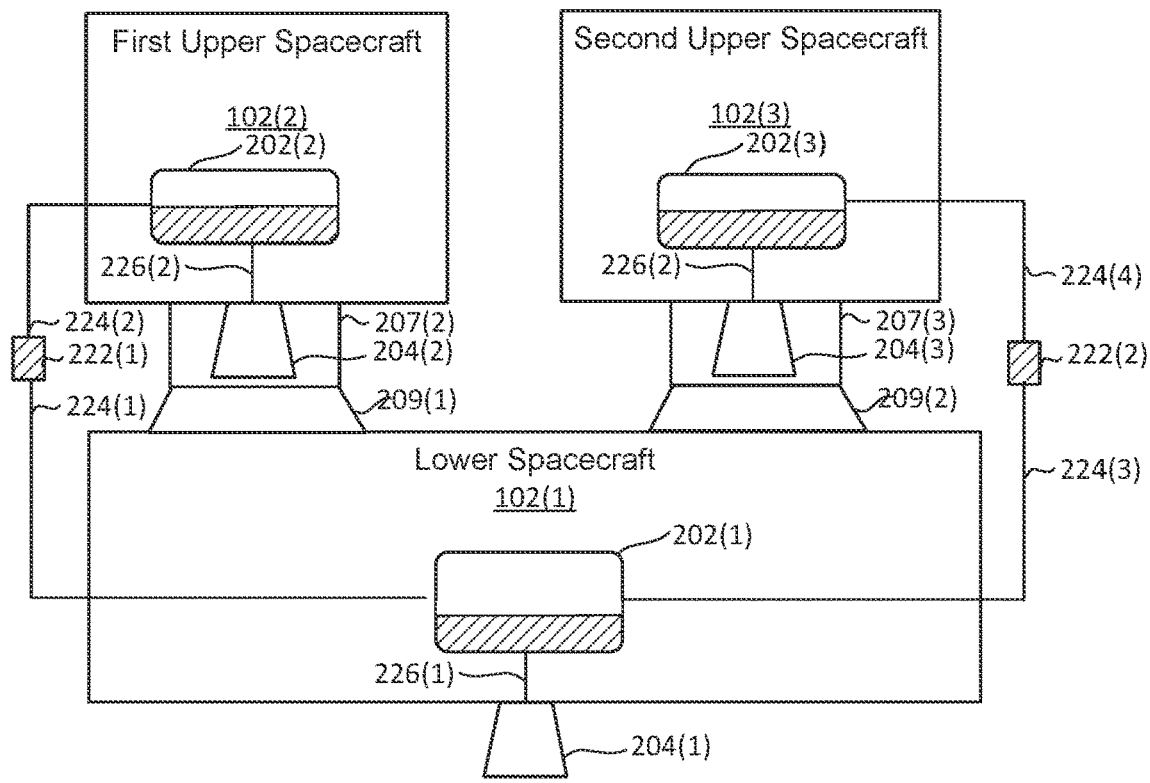

FIGS. 18A and 18B illustrate one embodiment of the transfer of propellant from the lower spacecraft 102(1) to a first upper spacecraft 102(2) and a second upper spacecraft 102(3). FIG. 18A depicts an embodiment of a stacked launch configuration in which there are three spacecraft 102(1), 102(2) and 102(3). In this embodiment, the lower spacecraft 102(1) has a first inter-spacecraft coupling arrangement 209(1) that is mechanically coupled, in the launch configuration, with an adapter 207(2) of the first upper spacecraft 102(2). The lower spacecraft 102(1) has a second inter-spacecraft coupling arrangement 209(2) that is mechanically coupled, in the launch configuration, with an adapter 207(3) of the second upper spacecraft 102(3). FIG. 18B depicts a configuration after launch in which some propellant from propellant storage 202(1) of the lower spacecraft 102(1) has been transferred to propellant storage 202(2) of the first upper spacecraft 102(2) and some propellant from propellant storage 202(1) of the lower spacecraft 102(1) has been transferred to propellant storage 202(3) of the second upper spacecraft 102(3).

In some embodiments, the process of FIG. 6 is modified for the stacked launch configuration of FIG. 17A or FIG. 18A. Step 604 may be modified by additionally configuring the propellant line arrangement to couple the first propellant storage 202(1) and the third propellant storage 202(3). Step 606 may be modified by additionally transferring propellant by way of the propellant line arrangement from the first propellant storage 202(1) to the third propellant storage 202(3) after launch of the launch vehicle. Step 608 may be modified by additionally deploying the second upper spacecraft 102(3) from the launch vehicle to the parking orbit. Step 610 may be performed to operate a thruster of the first upper spacecraft 102(2) using the propellant from the second propellant storage 202(2) that was transferred subsequent to launch from the first propellant storage 202(1) for an orbit raising maneuver that raises an orbit of at least the first upper spacecraft 102(2). Additionally, a thruster 204(3) of the second upper spacecraft 102(3) may be operated using the propellant from the third propellant storage 202(3) that was transferred subsequent to launch from the first propellant storage 202(1) for an orbit raising maneuver that raises an orbit of at least the second upper spacecraft 102(3). A wide range of orbit raising can be performed. For example, a chemical thruster of the lower spacecraft 102(1) could be used for orbit raising of the three spacecraft 102(1), 102(2) and 102(3), followed by using an electric thruster of the lower spacecraft 102(1) to raise the orbit of the lower spacecraft 102(1), using electric thruster of the first upper spacecraft 102(2) to raise the orbit of the first upper spacecraft 102(2) and using an electric thruster of the second upper spacecraft 102(3) to raise the orbit of the second upper spacecraft 102(3). This example is a variation of an embodiment of FIG. 7. Other orbit raising processes such as those in FIGS. 9, 11, 13, and 15 may also be modified to orbit raise a second upper spacecraft.

Figure 19:
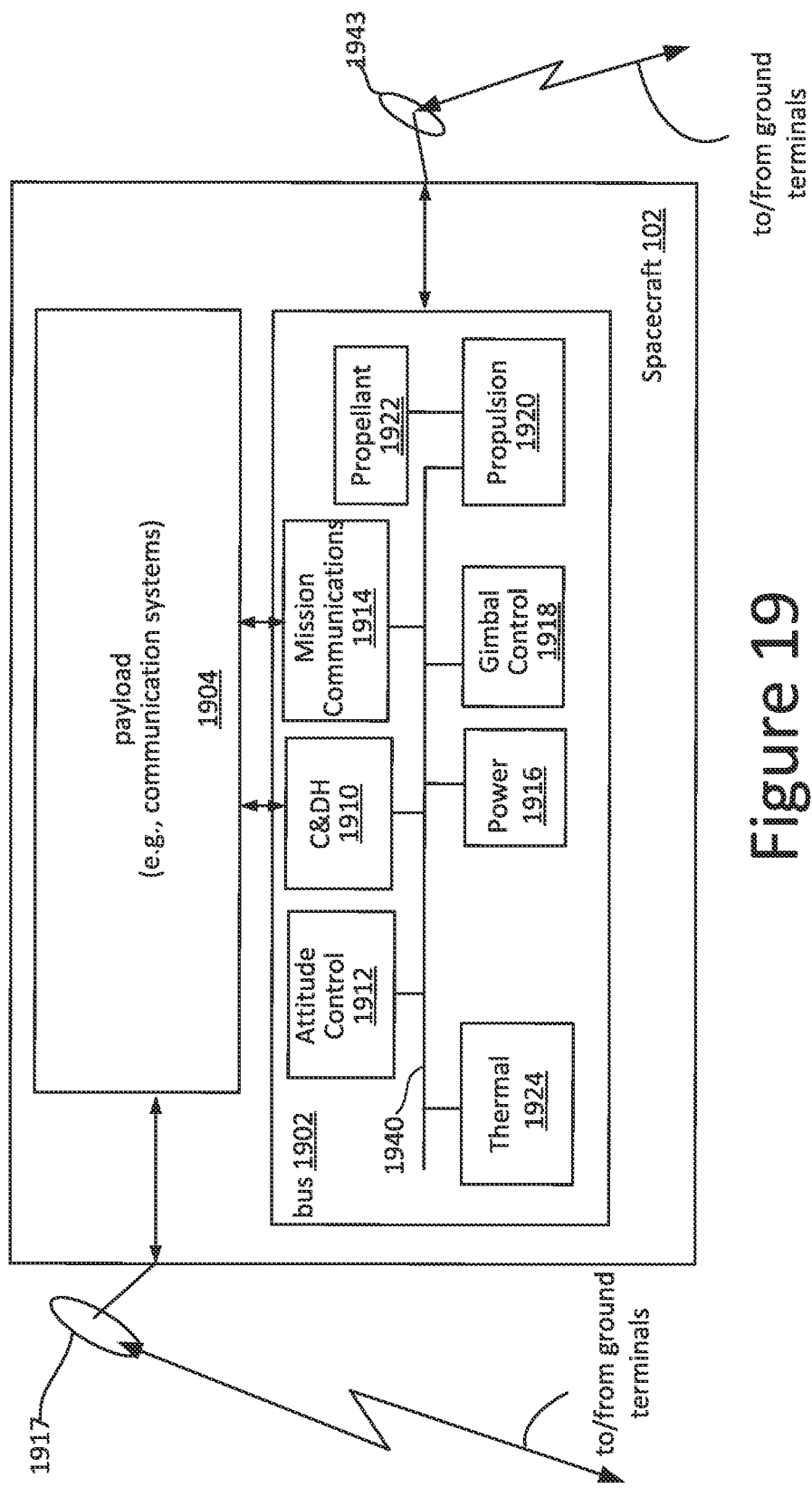
FIG. 19 is a block diagram of an example spacecraft.

FIG. 19 is a block diagram of one embodiment of spacecraft 102, which in one example (as discussed above) is a satellite. In one embodiment, spacecraft 102 includes a bus 1902 and a payload 1904 carried by bus 1902. Some embodiments of spacecraft 102 may include more than one payload. The payload provides the functionality of communication, sensors and/or processing systems needed for the mission of spacecraft 102.

In general, bus 1902 is the spacecraft that houses and carries the payload 1904, such as the components for operation as a communication satellite. The bus 1902 includes a number of different functional subsystems or modules, some examples of which are shown. Each of the functional subsystems typically include electrical systems, as well as mechanical components (e.g., servos, actuators) controlled by the electrical systems. These include a command and data handling subsystem (C&DH) 1910, attitude control systems 1912, mission communication systems 1914, power subsystems 1916, gimbal control electronics 1918 that be taken to include a solar array drive assembly, a propulsion subsystem 1920 (e.g., thrusters), propellant storage 1922 to fuel some embodiments of propulsion subsystem 1920, and thermal control subsystem 1924, all of which are connected by an internal communication network 1940, which can be an electrical bus (a "flight harness") or other means for electronic, optical or RF communication when spacecraft is in operation. In some embodiments the propulsion subsystem 1920 is used for orbit raising, as disclosed herein. In some embodiments, the propellant storage 1922 is empty at launch with the propellant being transferred from a lower spacecraft after launch, as disclosed herein. In some embodiments, the propellant storage 1922 stores propellent at launch with the propellant being transferred to a higher spacecraft after launch, as disclosed herein.

Also represented are an antenna 1943, that is one of one or more antennae used by the mission communication systems 1914 for exchanging communications for operating of the spacecraft with ground terminals, and a payload antenna 1917, that is one of one or more antennae used by the payload 1904 for exchanging communications with ground terminals, such as the antennae used by a communication satellite embodiment. Other equipment can also be included.

The command and data handling module 1910 includes any processing unit or units for handling includes command control functions for spacecraft 102, such as for attitude control functionality and orbit control functionality. The attitude control systems 1912 can include devices including torque rods, wheel drive electronics, and control momentum gyro control electronics, for example, that are used to monitor and control the attitude of the spacecraft. Mission communication systems 1914 includes wireless communication and processing equipment for receiving telemetry data/commands, other commands from the ground control terminal 30 to the spacecraft and ranging to operate the spacecraft. Processing capability within the command and data handling module 1910 is used to control and operate spacecraft 102. An operator on the ground can control spacecraft 102 by sending commands via ground control terminal 30 to mission communication systems 1914 to be executed by processors within command and data handling module 1910. In one embodiment, command and data handling module 1910 and mission communication system 1914 are in communication with payload 1904. In some example implementations, bus 1902 includes one or more antennae as indicated at 1943 connected to mission communication system 1914 for wirelessly communicating between ground control terminal 30 and mission communication system 1914. Power subsystems 1916 can include one or more solar panels and charge storage (e.g., one or more batteries) used to provide power to spacecraft 102. Propulsion subsystem 1920 (e.g., thrusters) is used for changing the position or orientation of spacecraft 102 while in space to move into orbit, to change orbit or to move to a different location in space. The gimbal control electronics 1918 can be used to move and align the antennae, solar panels, and other external extensions of the spacecraft 102.

In one embodiment, the payload 1904 is for a communication satellite and includes an antenna system (represented by the antenna 1917) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 1914 acts as an interface that uses the antennae of payload 1904 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

The components connected to the bus 1902 may by themselves, or in combination with components in ground control 30, be referred to as one or more control circuits. The one or more control circuits may comprise hardware and/or software. The one or more control circuits may be implemented at least in part by executing processor executable instructions on a processor (e.g., a microprocessor). The one or more control circuits may be implemented at least in part by an Application Specific Integrated Circuit (ASIC), FPGA, etc.

A first embodiment includes a system comprising a plurality of spacecraft mechanically coupled together in a stack in a launch configuration and a propellant line arrangement that couples the first propellant storage and the second propellant storage. The plurality of spacecraft comprise a first spacecraft comprising a first propellant storage and a first thruster coupled with the first propellant storage. The first spacecraft is configured to mechanically couple with a payload adapter of a launch vehicle in the launch configuration. The plurality of spacecraft comprise a second spacecraft comprising a second propellant storage and a second thruster coupled with the second propellant storage. In the launch configuration the second spacecraft is above the first spacecraft in the stack. The system is configured to transfer propellant by way of the propellant line arrangement, subsequent to a launch phase of the launch vehicle, from the first propellant storage to the second propellant storage. The system is configured to deploy the first spacecraft and the second spacecraft from the launch vehicle subsequent to the launch phase. The system is configured to operate the second thruster with the transferred propellant in the second propellant storage during an orbit raising maneuver of at least the second spacecraft subsequent to the deployment of the first spacecraft and the second spacecraft from the launch vehicle.

In a further embodiment, the system is configured to separate the first spacecraft from the second spacecraft prior to the orbit raising maneuver. The orbit raising maneuver raises the second spacecraft to a mission orbit.

In a further embodiment, the first spacecraft and the second spacecraft remain mechanically coupled during the orbit raising maneuver. The orbit raising maneuver raises both the first spacecraft and the second spacecraft to a higher altitude orbit than a parking orbit at which the second spacecraft and the first spacecraft were deployed from the launch vehicle.

In a further embodiment, the first spacecraft comprises a first electric propulsion subsystem that comprises the first propellant storage and the first thruster. The first thruster comprises a first electric thruster. The second spacecraft comprises a second electric propulsion subsystem that comprises the second propellant storage and the second thruster. The second thruster comprises a second electric thruster.

In a further embodiment, the first spacecraft further comprises a third propulsion subsystem that comprises a third propellant storage and a chemical thruster coupled to the third propellant storage. The system operates the chemical thruster using propellant from the third propellant storage for a first orbit raising maneuver that raises both the first spacecraft and the second spacecraft to a higher orbit than a parking orbit at which the first spacecraft and the second spacecraft were deployed from the launch vehicle. The orbit raising maneuver that raises the orbit of at least the second spacecraft is a second orbit raising maneuver that follows the first orbit raising maneuver to raise the second spacecraft to a mission orbit. The system is configured to separate the first spacecraft from the second spacecraft prior to the second orbit raising maneuver.

In a further embodiment, the system operates the chemical thruster using propellant from the third propellant storage for a third orbit raising maneuver that raises the first spacecraft to a mission orbit. The system is configured to separate the first spacecraft from the second spacecraft prior to the second orbit raising maneuver.

In a further embodiment, the system operates the first electric thruster of the first spacecraft using propellant from the first propellant storage for a third orbit raising maneuver that raises the first spacecraft to a mission orbit. The system is configured to separate the first spacecraft from the second spacecraft prior to the second orbit raising maneuver.

In a further embodiment, the first spacecraft comprises a third propulsion subsystem that comprises a third propellant storage and a chemical thruster coupled to the third propellant storage. The system operates the chemical thruster using propellant from the third propellant storage for a first orbit raising maneuver that raises both the first spacecraft and the second spacecraft to a higher orbit than a parking orbit at which the second spacecraft and the first spacecraft were deployed from the launch vehicle. The orbit raising maneuver that raises the orbit of at least the second spacecraft is a second orbit raising maneuver that follows the first orbit raising maneuver and uses the second electric propulsion subsystem to raise both the first spacecraft and the second spacecraft to a mission orbit, wherein the first spacecraft and the second spacecraft are separated after the second orbit raising maneuver.

In a further embodiment, the first spacecraft comprises a third propulsion subsystem that comprises a third propellant storage and a chemical thruster coupled to the third propellant storage. The system operates the chemical thruster using propellant from the third propellant storage for a first orbit raising maneuver that raises the first spacecraft from a parking orbit at which the second spacecraft and the first spacecraft were deployed from the launch vehicle to a first mission orbit of the first spacecraft. The orbit raising maneuver that raises the orbit of at least the second spacecraft is a second orbit raising maneuver that raises the second spacecraft from the parking orbit to a second mission orbit of the second spacecraft. The system is configured to separate the first spacecraft from the second spacecraft prior to the first and the second orbit raising maneuvers.

In a further embodiment, the system further comprises a third spacecraft disposed above the first spacecraft in the stack. The third spacecraft comprises a third propellant storage and a third thruster that is coupled with the third propellant storage. The propellant line arrangement couples the first propellant storage and the third propellant storage. The system is configured to transfer propellant by way of the propellant line arrangement, subsequent to launch, from the first propellant storage to the third propellant storage.

One embodiment includes a method for raising orbits of multiple spacecraft. The method comprises deploying a first spacecraft and a second spacecraft that are in a launch configuration in a launch vehicle into a parking orbit. In the launch configuration the first spacecraft is mechanically coupled with a payload adapter of the launch vehicle and the second spacecraft is above and mechanically coupled with the first spacecraft. The method comprises transferring propellant by way of a propellant line arrangement that couples a first propellant storage of the first spacecraft and a second propellant storage of the second spacecraft. The transferring occurs subsequent to reaching the parking orbit. The first spacecraft comprises a first thruster coupled with the first propellant storage and the second spacecraft comprises a second thruster coupled with the second propellant storage. The method comprises operating the second thruster of the second spacecraft for an orbit raising maneuver that raises an orbit of at least the second spacecraft using the propellant from the second propellant storage that was transferred subsequent to reaching the parking orbit.

One embodiment includes a system, comprising a plurality of satellites disposed within a fairing of a launch vehicle. The plurality of satellites comprise a lower satellite and an upper satellite. The upper satellite and the lower satellite are disposed together in a stack. The lower satellite is lower in the stack and is mechanically coupled with a payload adapter of the launch vehicle. The upper satellite is higher in the stack and is mechanically coupled with the lower satellite by way of an inter-satellite coupling arrangement. The lower satellite comprises a first electric propulsion subsystem comprising a first propellant storage and a first electric thruster that is coupled with the first propellant storage. The upper satellite comprises a second electric propulsion subsystem comprising a second propellant storage and a second electric thruster that is coupled with the second propellant storage. The system also comprises a propellant line arrangement that couples the first propellant storage and the second propellant storage. The system also comprises one or more control circuits configured to transfer propellant by way of the propellant line arrangement, subsequent to reaching a parking orbit after a launch phase of the launch vehicle. The one or more control circuits are configured to deploy the plurality of satellites from the fairing into the parking orbit. The one or more control circuits configured to operate the second electric propulsion subsystem using the transferred propellant from the second propellant storage for an orbit raising maneuver that raises at least the upper satellite to a higher orbit than the parking orbit.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. A system comprising:
a plurality of spacecraft mechanically coupled together in a stack in a launch configuration, the plurality of spacecraft comprising:
a first spacecraft comprising a first propellant storage and a first thruster coupled with the first propellant storage, wherein the first spacecraft is configured to mechanically couple with a payload adapter of a launch vehicle in the launch configuration; and
a second spacecraft comprising a second propellant storage and a second thruster coupled with the first propellant storage, wherein in the launch configuration the second spacecraft is above the first spacecraft in the stack, wherein the second propellant storage is empty at launch; and
a propellant line arrangement that couples the first propellant storage and the second propellant storage;
wherein the system is configured to:
control the propellant line arrangement to transfer propellant by way of the propellant line arrangement, subsequent to a launch phase of the launch vehicle, from the first propellant storage to the second propellant storage;
deploy the first spacecraft and the second spacecraft from the launch vehicle subsequent to the launch phase; and
operate the second thruster with the transferred propellant in the second propellant storage during an orbit raising maneuver of at least the second spacecraft subsequent to the deployment of the first spacecraft and the second spacecraft from the launch vehicle.

2. The system of claim 1, wherein:
the system is configured to separate the first spacecraft from the second spacecraft prior to the orbit raising maneuver; and
the orbit raising maneuver raises the second spacecraft to a mission orbit.

3. The system of claim 1, wherein:
the first spacecraft and the second spacecraft remain mechanically coupled during the orbit raising maneuver; and
the orbit raising maneuver raises both the first spacecraft and the second spacecraft to a higher altitude orbit than a parking orbit at which the second spacecraft and the first spacecraft were deployed from the launch vehicle.

4. The system of claim 1, wherein:
the first spacecraft comprises a first electric propulsion subsystem that comprises the first propellant storage and the first thruster, wherein the first thruster comprises a first electric thruster; and
the second spacecraft comprises a second electric propulsion subsystem that comprises the second propellant storage and the second thruster, wherein the second thruster comprises a second electric thruster.

5. The system of claim 4, wherein:
the first spacecraft further comprises a third propulsion subsystem that comprises a third propellant storage and a chemical thruster coupled to the third propellant storage;
the system operates the chemical thruster using propellant from the third propellant storage for a first orbit raising maneuver that raises both the first spacecraft and the second spacecraft to a higher orbit than a parking orbit at which the first spacecraft and the second spacecraft were deployed from the launch vehicle;
the orbit raising maneuver that raises the orbit of at least the second spacecraft is a second orbit raising maneuver that follows the first orbit raising maneuver to raise the second spacecraft to a mission orbit; and
the system is configured to separate the first spacecraft from the second spacecraft prior to the second orbit raising maneuver.

6. The system of claim 5, wherein the system operates the chemical thruster using propellant from the third propellant storage for a third orbit raising maneuver that raises the first spacecraft to a mission orbit, the system is configured to separate the first spacecraft from the second spacecraft prior to the second orbit raising maneuver.

7. The system of claim 5, wherein the system operates the first electric thruster of the first spacecraft using propellant from the first propellant storage for a third orbit raising maneuver that raises the first spacecraft to a mission orbit, the system is configured to separate the first spacecraft from the second spacecraft prior to the second orbit raising maneuver.

8. The system of claim 4, wherein:
the first spacecraft comprises a third propulsion subsystem that comprises a third propellant storage and a chemical thruster coupled to the third propellant storage;
the system operates the chemical thruster using propellant from the third propellant storage for a first orbit raising maneuver that raises both the first spacecraft and the second spacecraft to a higher orbit than a parking orbit at which the second spacecraft and the first spacecraft were deployed from the launch vehicle; and
the orbit raising maneuver that raises the orbit of at least the second spacecraft is a second orbit raising maneuver that follows the first orbit raising maneuver and uses the second electric propulsion subsystem to raise both the first spacecraft and the second spacecraft to a mission orbit, wherein the first spacecraft and the second spacecraft are separated after the second orbit raising maneuver.

9. The system of claim 4, wherein:
the first spacecraft comprises a third propulsion subsystem that comprises a third propellant storage and a chemical thruster coupled to the third propellant storage;
the system operates the chemical thruster using propellant from the third propellant storage for a first orbit raising maneuver that raises the first spacecraft from a parking orbit at which the second spacecraft and the first spacecraft were deployed from the launch vehicle to a first mission orbit of the first spacecraft;
the orbit raising maneuver that raises the orbit of at least the second spacecraft is a second orbit raising maneuver that raises the second spacecraft from the parking orbit to a second mission orbit of the second spacecraft; and
the system is configured to separate the first spacecraft from the second spacecraft prior to the first and the second orbit raising maneuvers.

10. The system of claim 1, further comprising a third spacecraft disposed above the first spacecraft in the stack, the third spacecraft comprising a third propellant storage and a third thruster that is coupled with the third propellant storage, wherein:
the propellant line arrangement couples the first propellant storage and the third propellant storage; and the system is configured to transfer propellant by way of the propellant line arrangement, subsequent to launch, from the first propellant storage to the third propellant storage.

11. A method for raising orbits of multiple spacecraft, the method comprising:
mechanically coupling together a plurality of spacecraft in a stack in a launch configuration, the plurality of spacecraft comprising:
a first spacecraft comprising a first propellant storage and a first thruster coupled with the first propellant storage, wherein when in the launch configuration the first spacecraft is mechanically coupled with a payload adapter of the launch vehicle; and
a second spacecraft comprising a second propellant storage and a second thruster coupled with the second propellant storage, wherein in the launch configuration the second spacecraft is above and mechanically coupled with the first spacecraft, wherein the second propellant storage is empty at launch;
deploying the first spacecraft and the second spacecraft that are in the launch configuration from the launch vehicle into a parking orbit;
transferring propellant by way of a propellant line arrangement that couples the first propellant storage of the first spacecraft and the second propellant storage of the second spacecraft, the transferring occurring subsequent to reaching the parking orbit and including controlling the propellant line arrangement to transfer propellant from the first propellant storage to the empty second propellant storage, wherein the first spacecraft comprises a first thruster coupled with the first propellant storage and the second spacecraft comprises a second thruster coupled with the second propellant storage; and
operating the second thruster of the second spacecraft for an orbit raising maneuver that raises an orbit of at least the second spacecraft using the propellant from the second propellant storage that was transferred from the first propellant storage subsequent to reaching the parking orbit.

12. The method of claim 11, further comprising:
separating the first spacecraft from the second spacecraft prior to the orbit raising maneuver, wherein the orbit raising maneuver raises the second spacecraft to a mission orbit.

13. The method of claim 11, maintaining the mechanical coupling of the first spacecraft and the second spacecraft during the orbit raising maneuver, wherein the orbit raising maneuver raises both the first spacecraft and the second spacecraft to a higher orbit than the parking orbit.

14. The method of claim 11, wherein operating the second thruster of the second spacecraft for the orbit raising maneuver that raises the orbit of at least the second spacecraft using the propellant from the second propellant storage that was transferred from the first propellant storage subsequent to reaching the parking orbit comprises:
operating an electric thruster of an electric propulsion subsystem of the second spacecraft using the transferred propellant.

15. The method of claim 11, wherein operating the second thruster of the second spacecraft for the orbit raising maneuver that raises the orbit of at least the second spacecraft using the propellant from the second propellant storage that was transferred from the first propellant storage subsequent to reaching the parking orbit comprises:
operating an electric thruster of an electric propulsion subsystem of the second spacecraft using the transferred propellant to raise the orbit of both the first spacecraft and the second spacecraft using the transferred propellant.

16. The method of claim 11, further comprising:
operating a chemical thruster of the first spacecraft for a first orbit raising maneuver that raises an orbit of both the first spacecraft and the second spacecraft from the parking orbit to a higher orbit, wherein the orbit raising maneuver that raises the orbit of at least the second spacecraft is a second orbit raising maneuver that follows the first orbit raising maneuver.

17. A system, comprising:
a plurality of satellites disposed within a fairing of a launch vehicle, the plurality of satellites comprising a lower satellite and an upper satellite, wherein the upper satellite and the lower satellite are disposed together in a stack, the lower satellite is lower in the stack and is mechanically coupled with a payload adapter of the launch vehicle, the upper satellite is higher in the stack and is mechanically coupled with the lower satellite by way of an inter-satellite coupling arrangement, the lower satellite comprising a first electric propulsion subsystem comprising a first propellant storage and a first electric thruster that is coupled with the first propellant storage, the upper satellite comprising a second electric propulsion subsystem comprising a second propellant storage and a second electric thruster that is coupled with the second propellant storage, wherein the second propellant storage is empty at launch;
a propellant line arrangement that couples the first propellant storage and the second propellant storage; and
one or more control circuits configured to:
control the propellant line arrangement to transfer propellant by way of the propellant line arrangement, subsequent to reaching a parking orbit after a launch phase of the launch vehicle, from the first propellant storage to the second propellant storage;
deploy the plurality of satellites from the fairing into the parking orbit; and
operate the second electric propulsion subsystem using the transferred propellant from the second propellant storage for an orbit raising maneuver that raises at least the upper satellite to a higher orbit than the parking orbit.

18. The system of claim 17, wherein:
the one or more control circuits are configured to separate the lower satellite from the upper satellite prior to the orbit raising maneuver; and
the orbit raising maneuver raises the upper satellite to a mission orbit.

19. The system of claim 17, wherein:
the one or more control circuits are configured to keep the lower satellite mechanically coupled with the upper satellite during the orbit raising maneuver; and
the orbit raising maneuver raises both the lower satellite and the upper satellite to a higher orbit than the parking orbit.

20. The system of claim 17, wherein:
the lower satellite comprises a third propulsion subsystem that comprises a third propellant storage coupled to a chemical thruster; and
the one or more control circuits are configured to operate the chemical thruster using propellant from the third propellant storage for a first orbit raising maneuver that raises both the lower satellite and the upper satellite to a higher orbit than the parking orbit, wherein the orbit raising maneuver that raises the orbit of at least the upper satellite is a second orbit raising maneuver that follows the first orbit raising maneuver.

* * * * *